(12) United States Patent
Suo-Anttila

(10) Patent No.: US 6,718,311 B1
(45) Date of Patent: Apr. 6, 2004

(54) VARIANCE ALERTING DISPENSER SYSTEM AND VARIANCE DETECTOR APPARATUS AND METHOD

(75) Inventor: Tap Suo-Anttila, Coquitlam (CA)

(73) Assignee: Sprint Enterprises Inc., Surrey (CA)

( * ) Notice: Subject to any disclaimer, the term of this patent is extended or adjusted under 35 U.S.C. 154(b) by 0 days.

(21) Appl. No.: 09/192,765

(22) Filed: Nov. 16, 1998

(51) Int. Cl.$^7$ .............................................. G06F 17/60
(52) U.S. Cl. ................ 705/28; 705/1; 705/16; 705/26; 705/500; 705/22; 700/240; 700/236; 700/231; 700/233; 700/239; 700/283; 700/285; 221/1; 221/2; 225/5; 702/12; 702/25; 702/50; 702/55
(58) Field of Search ................ 705/1, 16, 26, 705/500, 22, 28; 700/240, 236, 231, 233, 239, 283, 285; 221/1, 2, 5

(56) References Cited

U.S. PATENT DOCUMENTS

| | | | |
|---|---|---|---|
| 3,699,315 A | 10/1972 | Upton | 235/92 FL |
| 3,965,337 A | 6/1976 | Young | 235/92 FL |
| 4,212,068 A * | 7/1980 | Hoyt | 705/413 |
| 4,278,186 A | 7/1981 | Williamson | 222/36 |
| 4,658,371 A * | 4/1987 | Walsh et al. | 700/283 |
| 4,827,426 A | 5/1989 | Patton et al. | 364/479 |
| 4,879,641 A * | 11/1989 | Rossi et al. | 363/98 |
| 4,961,533 A | 10/1990 | Teller et al. | 177/25.19 |
| 4,979,641 A | 12/1990 | Turner | 222/25 |
| 5,007,560 A | 4/1991 | Sassak | 222/1 |
| 5,255,819 A | 10/1993 | Peckels | 222/1 |
| 5,400,253 A * | 3/1995 | O'Connor | 701/123 |
| 5,454,406 A * | 10/1995 | Rejret et al. | 141/1 |
| 5,603,430 A * | 2/1997 | Loehrke et al. | 222/1 |
| 5,604,487 A * | 2/1997 | Frymier | 340/825.07 |
| 5,659,482 A * | 8/1997 | Warn et al. | 700/236 |
| 5,731,981 A * | 3/1998 | Simard | |
| 5,769,271 A | 6/1998 | Miller | 222/1 |
| 6,089,284 A * | 7/2000 | Kaehler et al. | 141/94 |
| 6,128,551 A * | 10/2000 | Davis et al. | 700/236 |

FOREIGN PATENT DOCUMENTS

EP 0952709 * 10/1999 ........... H04L/12/56

* cited by examiner

*Primary Examiner*—Tariq R. Hafiz
*Assistant Examiner*—Akiba Robinson-Boyce

(57) ABSTRACT

A method, apparatus and system, the method comprising receiving a request indication representing a request for an item, receiving a provided indication representing providing said item, and signalling an operator when the request indication has no corresponding provided indication. The apparatus includes a request indication receiver for receiving the request indication, a provided indication receiver for receiving the provided indication, a processing circuit for determining when the request indication has no corresponding provided indication, and a signal device in communication with the processing circuit for signalling the operator when the request indication has no corresponding provided indication. The system includes the apparatus and further includes a point of sale terminal in communication with the request indication receiver for providing representations of new requested amounts of an item, and a fluid dispensing system in communication with the provided indication receiver for providing representations of new provided amounts of the item.

64 Claims, 26 Drawing Sheets

RECIPE TABLE

| RAM BASE ADDRESS (=PLU#) | COUNT | INGRED #1 | | INGRED #2 | | .... | INGRED #6 | |
|---|---|---|---|---|---|---|---|---|
| | | BRAND # | AMOUNT | BRAND # | AMOUNT | | BRAND # | AMOUNT |
| 1 | | 1 | 1 | 4 | 2 | .... | | |
| 2 | | 4 | 0.5 | 1 | 0.5 | | 17 | 1 |
| ⋮ | | | | | | | | |
| 255 | 15 | 1 | 1 | 5 | 1 | | | |
| 256 | | | | | | | | |
| ⋮ | | | | | | | | |
| 300 | | | | | | | | |

FIG. 20

BALANCE TABLE

| RAM BASE ADDRESS (=BRAND#) | BRAND NAME | PREVIOUS ACCUM | NEW ACCUM | BILLED TOTAL | DISPENSED TOTAL | TOP DISPLAY FLAG | BOTTOM DISPLAY FLAG | TIMEOUT PERIOD 0 (NEWEST) R/P FLAG | TIMEOUT PERIOD 0 (NEWEST) FIELD CONTENTS(F) | ... | TIMEOUT PERIOD 0 (NEWEST) R/P FLAG | TIMEOUT PERIOD 0 (NEWEST) FIELD CONTENTS(F) | TOLERANCE |
|---|---|---|---|---|---|---|---|---|---|---|---|---|---|
| 01 | VODKA | | | 2462 | 2462 | 1 | 0 | 1 | 1 | ... | 1 | | 0 |
| 02 | GIN | | | 3570 | 3568 | 1 | 1 | 0 | 1 | ... | 0 | | 0 |
| ... | ... | | | | | | | | | | | | |
| 255 | COORS | | 7 | 7 | 7 | 0 | 0 | 1 | 0 | ... | 0 | 0 | 0.5 |

FIG. 21

VARIANCE ALERTING DISPENSER SYSTEM AND VARIANCE DETECTOR APPARATUS AND METHOD

FIELD OF THE INVENTION

This invention relates to methods, apparatus and systems in which items are provided in response to requests for such items, and in which it is desired to ensure that an item is provided in response to each request for such item. The invention has particular application to the dispensing of beverages such as in a bar or night club, for example.

BACKGROUND OF THE INVENTION

Many systems exist in which requests for an item are received and items are provided in response to such requests. An example of such a system is that used to provide customers with beverages in a bar or night club. In some bars, waitresses, waiters and/or customers make requests for drinks by speaking to a bartender. A record of the request for a drink is simultaneously or shortly thereafter entered into a point of sale system such as a cash register. The bartender then responds by making the drink and providing it to the customer or to the waiter or waitress for transport to the customer.

As a bar gets busy, there may be a plurality of waitresses and/or customers all speaking to the bartender at the same time or in rapid succession, and the bartender may not be able to keep up with such requests or may forget some of the requests. Conversely, the bartender, waiters or waitresses may forget to enter into the cash register a request for a particular drink provided by the bartender. Dishonest practices of bartenders or waitresses may also result in failure to enter a request for a drink into the cash register. Consequently, requests for drinks or items may not be matched with provisions of the drinks or items, resulting in over or under charging customers and too few or too many drinks being provided. This can result in loss of revenue to a bar owner, both directly in the case of failure to enter a request, and indirectly where a customer becomes dissatisfied because of a failure to promptly provide a drink for which the customer has been billed.

In the past, a number of systems have been proposed to monitor the dispensing of beverages.

One such system involves a dispensing pump and a control console for controlling the pump. Information on drinks made and served is automatically downloaded to a Point-of-Sales (POS) system or a cash register. However, this system requires the substitution of a positive displacement pump for conventional dispensing systems, and requires a separate pump for each drink to be monitored, disadvantageously resulting in additional expenses. Also, by automatically downloading information on the dispensed drinks to a cash register, this system fails to address the problem that the same volume of the same liquor may have several different prices, depending on whether it is served by itself, in a larger size, or in a mixed drink. Furthermore, this system removes a bartender's discretion to generate legitimate variances between dispensed amounts and billed amounts, for example, to replace drinks spilled by bartending staff, to provide "taster" samples, or to provide complimentary drinks to regular customers.

Another such system employs a plurality of assemblies to determine weights of bottles placed thereon, and a unique element placed on each bottle to identify the particular bottle. Each assembly includes a transducer for producing an output signal indicative of the weight of a bottle placed on the assembly, and a sensor for producing an output signal indicative of the identifying unique element on the bottle. A computer receives both of these output signals, and computes the weight of each bottle. When a bottle is removed from one of the assemblies to pour a beverage, and then replaced onto one of the assemblies, the computer is able to compute the change in weight of the bottle, and thus the volume dispensed. However, this system would require large capital expenditures, since a separate weighing assembly would be required for every bottle or container in use in the bar. This system also carries a significant time cost, since staff members must painstakingly attach an identifying unique element to every bottle or container in the bar.

In a third system, if a staff member attempts to dispense a drink without first identifying himself by entering an authorization code, an automatic valve will close, preventing further dispensation. In a fourth similar system, a staff member is issued a credit card with a fixed credit. The staff member must insert the credit card in a dispensing device before dispensing each beverage. When the fixed credit is used, the server must return the card to a cashier and pay the cashier the cash equivalent of the used credit. In addition to the aforementioned difficulty of removing the server's discretion to generate legitimate variances, these systems increase the amount of time required to dispense each beverage, and are therefore unsuitable for busy, large-capacity establishments.

Thus, there is a need for a relatively inexpensive and unobtrusive dispensing system which calculates variances between provided and requested amounts of an item, and which signals an operator when a requested item has not been provided. Such a system may be used to remind bartenders to dispense billed drinks and to bill dispensed drinks.

SUMMARY OF THE INVENTION

The present invention addresses the above need by providing an apparatus operable to receive request indications for an item and indications that the item has been provided, and by signalling an operator, such as a bartender, when a request indication has no corresponding provided indication. By means of the above apparatus, requests for items are matched with corresponding provisions of such items and the operator is notified when a request indication has no corresponding provided indication. The invention may be extended to further notify the operator when a provided indication has no corresponding request indication.

In accordance with one aspect of the invention, there is provided a method and apparatus for receiving a request indication representing a request for an item, receiving a provided indication representing providing the item, and signalling an operator when the request indication has no corresponding provided indication. The apparatus includes a request indication receiver, a provided indication receiver, a processing circuit and a signal device in communication with the processing circuit for carrying out the method.

Preferably, the signal device signals the operator when the provided indication has no corresponding request indication.

The apparatus may include a storage device and the method may include receiving and storing a plurality of request indications and a plurality of provided indications. The processing circuit may cooperate with the signal device to carry out the method by signalling the operator when a newly received request indication has no corresponding stored provided indication, or when a newly received provided indication has no corresponding stored request indication.

Receiving the request indication may include receiving a representation of a requested amount of the item, and receiving the provided indication may include receiving a representation of a provided amount of the item. The request indication receiver and provided indication receiver are operable to carry out these steps.

Preferably, the method includes, when a new requested amount representation is received, cancelling a previous provided amount while reducing the new requested amount by the cancelled provided amount and adding any non-cancelled new requested amount to a previous requested amount. Similarly, the method preferably includes, when a new provided amount representation is received, cancelling the previous requested amount while reducing the new provided amount by the cancelled requested amount and adding any non-cancelled new provided amount to the previous provided amount. The processing circuit cooperates with the storage device to perform these steps. The method may further include signalling an operator when the non-cancelled new requested amount or the non-cancelled new provided amount is not equal to zero. The processing circuit cooperates with the storage device to actuate the signal device to achieve such signalling.

Optionally, the method includes associating the previous requested amounts and the previous provided amounts with respective time periods. In this case, the processing circuit cooperates with the storage device to store a plurality of the representations associated with respective time periods.

Preferably, cancelling the previous provided amount includes cancelling the previous provided amounts associated with successively later time periods while reducing the new requested amount by each cancelled previous provided amount and adding any non-cancelled new requested amount to the previous requested amount associated with a latest time period. Similarly, cancelling the previous requested amount preferably includes cancelling the previous requested amounts associated with successively later time periods while reducing the new provided amount by each cancelled previous requested amount and adding any non-cancelled new provided amount to the previous provided amount associated with a latest time period. The processing circuit cooperates with the storage device to achieve such cancelling.

Optionally, the method includes receiving the new requested amount from a point of sale system, and if so, the request indication receiver is operable to receive the representation of the new requested amount from the point of sale system.

The method may include receiving the new provided amount from a fluid dispensing system, which may include a liquor dispensing system. In such a case, the provided indication receiver is operable to receive the representation of the new requested amount from the fluid dispensing system or liquor dispensing system.

The method preferably includes storing the representations, which is achieved by cooperation of the processing circuit and storage device.

Ideally, the method further includes maintaining a provided total of each of the cancelled previous provided amounts and previous provided amounts which have not been cancelled within a pre-defined period of time, and maintaining a requested total of each of the cancelled previous requested amounts and previous requested amounts which have not been cancelled within the pre-defined period of time. Again, the processing circuit cooperates with the storage device to perform these steps.

The method preferably includes calculating a difference between the provided total and the requested total, and displaying the difference. The processing circuit cooperates with the storage device to calculate the difference, and the signal device includes a display in communication with the processing circuit for displaying the difference. The signal device may also include a printer in communication with the processing circuit such that the processing circuit directs the printer to print an indication of the difference.

Optionally, the method includes calculating a sum of non-cancelled previous requested amounts and displaying the sum of the non-cancelled previous requested amounts. Similarly, the method may include calculating a sum of non-cancelled previous provided amounts and displaying the sum of the non-cancelled previous provided amounts. Once again, the processing circuit cooperates with the storage device to calculate these sums, and the signal device includes a display in communication with the processing circuit for displaying these sums.

In accordance with another aspect of the invention, there is provided a method and apparatus for receiving information indicating at least one of a new requested amount of at least one of a plurality of items and a new provided amount of at least one of the plurality of items.

The method may include, when information relating to the new requested amount is received, determining which of the items the new requested amount relates to, and for the item, cancelling a previous provided amount while reducing the new requested amount by the cancelled provided amount and adding any non-cancelled new requested amount to a previous requested amount.

Similarly, the method preferably includes, when information relating to the new provided amount is received, determining which of the items the new provided amount relates to and for the item cancelling the previous requested amount while reducing the new provided amount by the cancelled requested amount and adding any non-cancelled new provided amount to the previous provided amount.

The method may further include signalling an operator when the non-cancelled new requested amount or the non-cancelled new provided amount is not equal to zero.

The method preferably includes, for each item, associating the previous requested amounts and the previous provided amounts with respective time periods.

Optionally, cancelling the previous provided amount includes cancelling the previous provided amounts associated with successively later time periods while reducing the new requested amount by each cancelled previous provided amount and adding any non-cancelled new requested amount to the previous requested amount associated with a latest time period.

Similarly, cancelling the previous requested amount optionally includes cancelling the previous requested amounts associated with successively later time periods while reducing the new provided amount by each cancelled previous requested amount and adding any non-cancelled new provided amount to the previous provided amount associated with a latest time period.

Optionally, receiving the new provided amount includes receiving the new provided amount from a fluid dispensing system, and receiving the new provided amount includes receiving the new provided amount from a liquor dispensing system.

Preferably, the method further includes storing, for each item of the plurality of items, a representation of at least one of the previous requested amount and the previous provided amount. The method may further include, for each item of the plurality of items, maintaining a provided total of each of the cancelled previous provided amounts and previous provided amounts which have not been cancelled within a pre-defined period of time, and a requested total of each of the cancelled previous requested amounts and previous requested amounts which have not been cancelled within the pre-defined period of time.

The method ideally includes, for each item of the plurality of items, calculating a difference between the provided total and the requested total, and displaying the difference, for at least one of the plurality of items. The method preferably includes, for each item of the plurality of items, calculating a sum of non-cancelled previous requested amounts and displaying the sum of the non-cancelled previous requested amounts, for at least one of the plurality of items. Likewise, the method preferably includes, for each item of the plurality of items, calculating a sum of non-cancelled previous provided amounts and displaying the sum of the non-cancelled previous provided amounts, for at least one of the plurality of items.

The apparatus may further include means for carrying out the functionality of the various method steps above.

In accordance with another aspect of the invention, there is provided a system including the apparatus above and further comprising a point of sale terminal in communication with the request indication receiver for providing the representations of the new requested amounts of the item. The system preferably includes a fluid dispensing system in communication with the provided indication receiver for providing the representations of the new provided amounts of the item. The fluid dispensing system may include a liquor dispensing system or a beer dispensing system. Optionally, the system includes a printer in communication with the apparatus for printing information stored in the storage device.

When employed in a bar or nightclub, with the plurality of items comprising beer and various liquors, the current invention receives information pertaining to all drinks sold from a Point-of-Sale (POS) system, and receives information pertaining to all drinks dispensed from, for example, one or more liquor guns and one or more draft beer dispensers. A top portion of a display reminds a bartender of any recent variances, i.e., recently-billed or requested drinks which have not yet been dispensed or provided, and recently-dispensed or provided drinks which have not yet been billed or requested. "Recently" can be any user-selected period of time, for example, the last ten minutes. A bottom portion of the display informs the bartender of any such accumulated variances over the course of the evening, excluding the "recent" variances displayed at the top of the display. When, with the passage of time, a recent variance "times out" or ceases to be recent and becomes an accumulated variance, a reminder slip may also be printed. Thus, information pertaining to variances between requested (billed) amounts and provided (dispensed) amounts is provided to the bartender in real time, enabling him to quickly correct any discrepancies while they are fresh in his mind, rather than trying to recall, at the end of a long evening, how a specific variance arose. Advantageously, if a busy bartender has forgotten to pour a drink for which a customer has been billed, the bartender will be automatically reminded to do so, before the customer becomes impatient or dissatisfied. Conversely, if the bartender has forgotten to bill a customer for a poured drink, he will be promptly reminded to do so. If reminder slips are printed, the bartender may retain such slips and may choose to make a quick notation to indicate "legitimate" variances, for example, to provide replacements for spilled drinks, "tasters", or complimentary drinks to preferred customers.

It will be appreciated that the current invention may be easily adapted for use in conventional dispensing systems. A Hall effect or similar metering device may be inserted at any convenient location along tubing or piping used to carry the beer or other dispensate from a keg or container to a dispensing device. A liquor dispensing card in accordance with the invention may be used with a conventionally-styled liquor dispensing gun, preferably incorporating alternating polarity switching components to prevent electrolysis and corrosion. Advantageously, therefore, bartenders or other staff will require only minimal instruction as to the use of the current invention, and will be able to dispense drinks in essentially the manner to which they have been accustomed. In a larger establishment, the system may include a plurality of beer dispensers and liquor dispensers in communication with the apparatus. Service in high-volume, large-capacity nightclubs need not be hampered by a need to enter payment or enter an authorization code or credit card prior to dispensing each drink.

BRIEF DESCRIPTION OF THE DRAWINGS

In drawings which illustrate various embodiments of the invention,

FIG. 20 is a schematic representation of a recipe table stored in memory accessible by the processing circuit of the variance controller;

FIG. 21 is a schematic representation of a balance table stored in memory accessible by the processing circuit of the variance controller;

DETAILED DESCRIPTION

Figure 1:
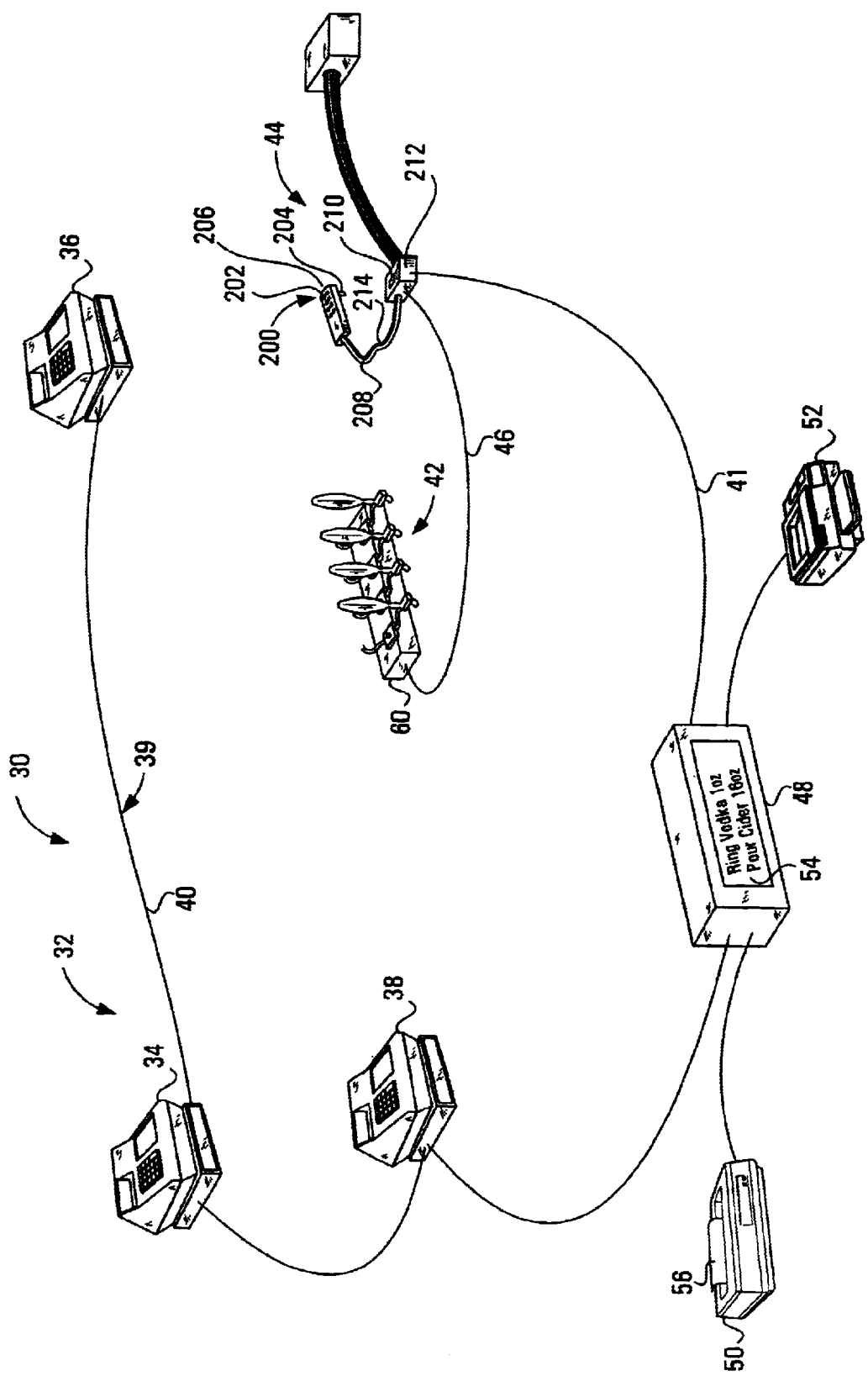
FIG. 1 is a schematic diagram of a system according to a first embodiment of the invention.

A liquor dispensing system for a bar is shown generally at 30 in FIG. 1. The system includes a point of sale (POS) system shown generally at 32 including a first cash register 34, a second cash register 36 and a third cash register 38. The cash registers are interconnected by a communications network 39 including a conduit 40 over which electronic messages may be transmitted from the cash registers.

The system 30 further includes a plurality of draft beer dispensers 42 and a metered liquor dispensing system 44. The draft beer dispensers 42 are in communication with the metered liquor dispensing system 44 through a section 46 of a conduit 41 of the network 39 and the metered liquor dispensing system 44 is connected to a variance controller 48. The variance controller 48 is further connected to the POS system 32 through the network 39 and is further connected to a first printer 50 which may be located behind a bar, and to a second conventional printer 52 which may be located in the bar manager's office, for example.

Effectively, the variance controller 48 monitors requests for beer or liquor made at any of the cash registers 34, 36 and 38 and monitors amounts of liquor provided by the draft beer dispensers 42 and the metered liquor dispensing system 44, and notifies an operator when at least one of the requests made at one of the cash registers is not matched with a corresponding provided amount of beer or liquor from the draft beer dispensers 42 and the metered liquor dispensing system 44. Such notification to the operator occurs through an LCD display 54 on the variance controller 48 and a corresponding printed chit 56 produced by the bar printer 50.

In addition, a record of the discrepancy is printed in a batch job which is ultimately printed at the printer 52, at the end of a shift or at the end of the day or any other time period deemed appropriate by a manager of the system.

The variance controller 48 may further notify the operator by the methods described above when beer or liquor has been provided or dispensed from the draft beer dispensers 42 or the metered liquor dispensing system 44 and no corresponding request has been received at one of the cash registers, within a pre-determined time.

Still referring to FIG. 1, the draft beer dispensers 42 are connected to a metering system 60 which monitors the amount of beer flowing to each dispenser when beer is dispensed, and keeps track of the total volume of beer dispensed through each dispenser. When requested to do so by the variance controller 48, the metering system 60 sends a message to the variance controller indicating the total accumulated amount of beer dispensed through the dispenser of interest. The total accumulated amount of beer may be the total accumulated over any predefined period of time, for example, an eight hour shift, a twelve hour day, a week, etc.

Metering System

Figure 2:
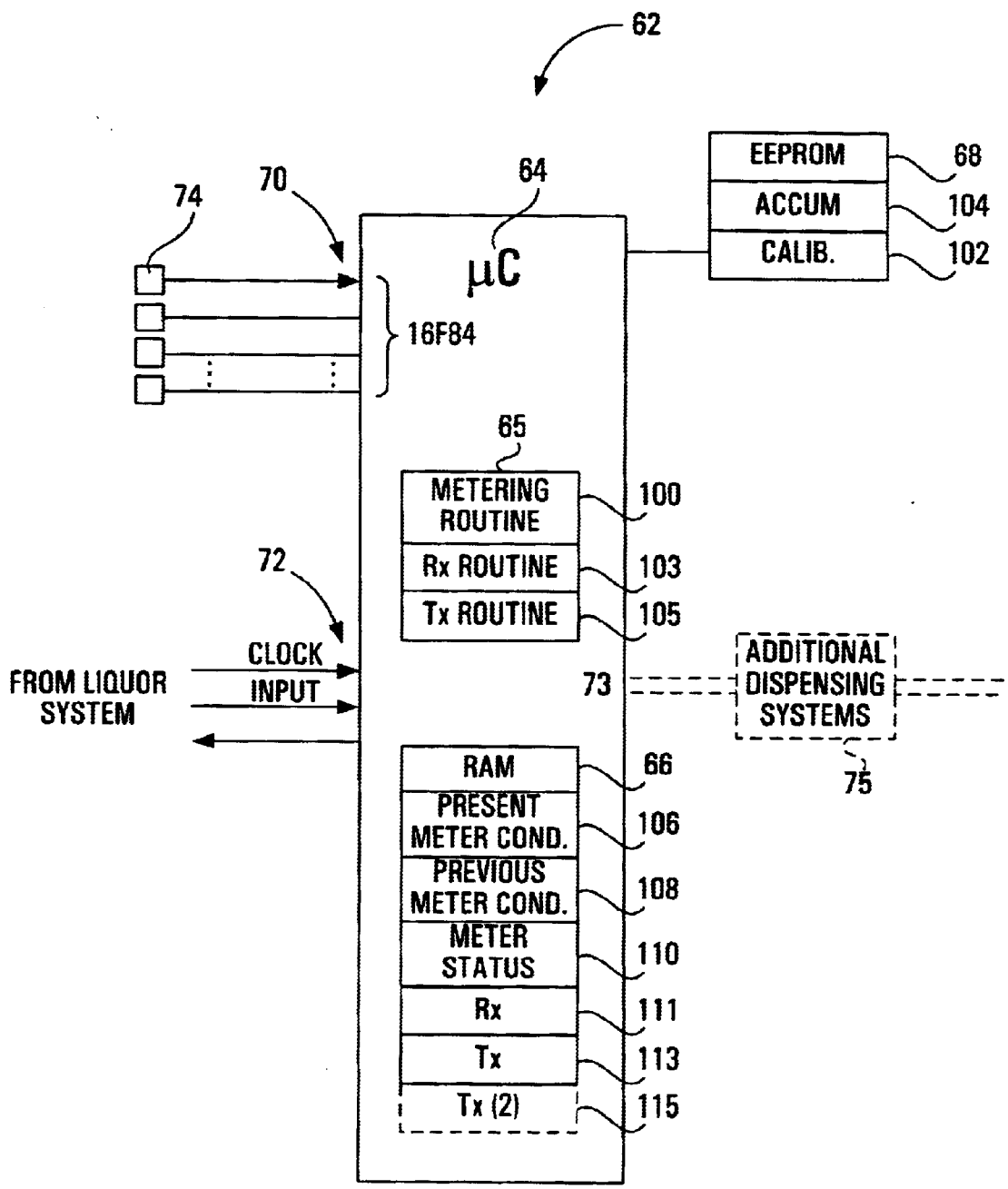
FIG. 2 is a block diagram of a metering system shown in FIG. 1.

Referring to FIG. 2, the metering system includes a processing circuit shown generally at 62. The processing circuit includes a microcontroller 64 which, in this embodiment, is a PIC 16F84 with internal program memory 65 and integral random access memory (RAM) 66. The microcontroller 64 is connected to external, electrically erasable programmable read-only memory (EEPROM) 68 and has first and second I/O ports shown generally at 70 and 72 respectively.

The first I/O port 70 has four inputs, each of which is connected to a respective metering switch, one of which is shown at 74.

Figure 3:
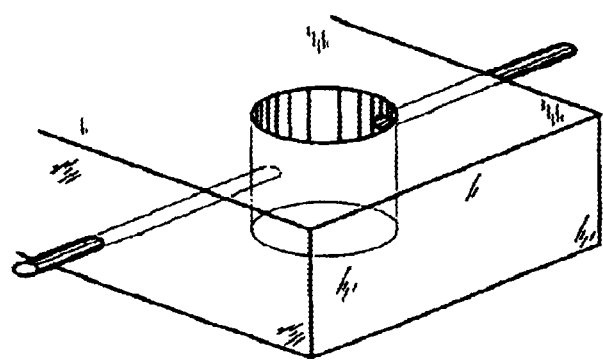
FIG. 3 is a cross-sectional view of a flow sensor employed by the metering system.
Figure 3:
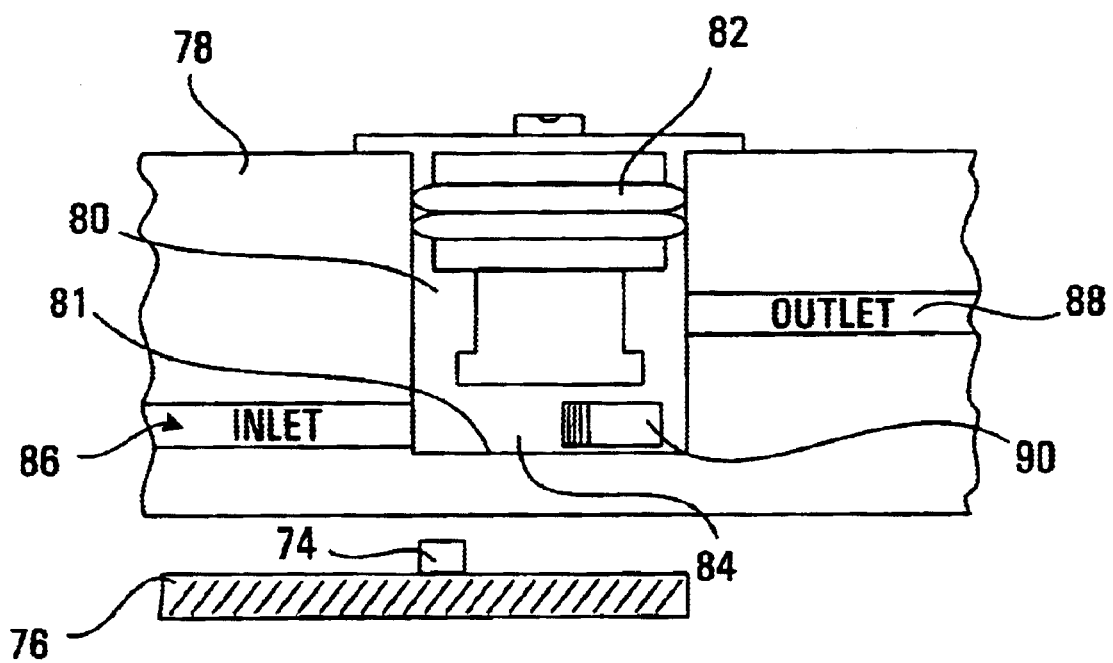

Referring to FIG. 3, the switch 74 is shown mounted on a flow meter 78 including a printed circuit board 76 disposed beneath a plastic metering body. The plastic metering body has a cavity 80 in which is received a plug 82. The plug extends into the cavity 80 to a depth which provides a space 84 between the plug and a bottom portion 81 of the cavity 80. The plastic metering body is formed with an inlet conduit 86 which leads into the space 84. The plastic is further formed with an outlet conduit 88 extending adjacent the plug 82 but above the inlet conduit 86. The plug 82 is formed so as to prevent fluid entering the inlet conduit 86 from exiting from the cavity 80 while permitting such fluid to travel through the space 84 around at least a portion of the plug 82 and into the outlet conduit 88. A circular puck-shaped magnet 90 is received in the space 84 such that the magnet is operable to move in a circular motion within the space 84 under the influence of the force provided by fluid received in the space 84 from the inlet conduit 86. Thus, pressurized fluid entering the space 84 from the inlet causes the magnet 90 to revolve in a circular motion in the space 84. The switch 74 is magnetically actuated and, in this embodiment, includes a magnetic reed switch or Hall effect sensor which is actuated by the magnet 90, each time the magnet 90 is directly above the switch 74.

Referring to FIGS. 2 and 3, when fluid is allowed to flow through the space 84, the magnet moves into and out of alignment with the switch 74, thereby causing the switch to produce a pulse stream at the corresponding input of the first I/O port 70. In this embodiment, the I/O port has four inputs and thus, four separate flow meters 78 as shown in FIG. 3 are used to enable beer dispensed from four different valves to be metered.

Referring back to FIG. 2, the second I/O port 72 is a conventional duplex serial communications port for allowing the processing circuit 62 to send and receive messages on the section 46 of the network 39 shown in FIG. 1.

Referring back to FIG. 2, the program memory 65 is programmed with a plurality of codes for directing the processing circuit 62 to execute a metering routine 100. The metering routine 100 defines in the EEPROM memory 68, a plurality of calibration registers 102, and also a plurality of accumulator registers 104, one for each dispenser.

The metering routine also defines in RAM 66 a present meter condition register 106, a previous meter condition register 108, and a meter status register 110. The present meter condition register 106 is loaded by reading the first I/O port 70 and storing the byte so read in the present meter condition register 106. The previous meter condition register 108 stores a byte representing a meter condition on an immediately previous read.

The meter accumulator registers 104 are incremented by the microcontroller 64 shown in FIG. 2 according to whether or not the associated meter has had a change in status since the last time the meter was read. In effect, respective meter accumulator registers are incremented each time the arrangements shown in FIG. 3 are directly over their corresponding switches.

The meter status register 110 is loaded by the microcontroller 64 such that each bit position is used to hold a bit representing whether or not the corresponding meter accumulator register 104 was incremented.

Figure 4:
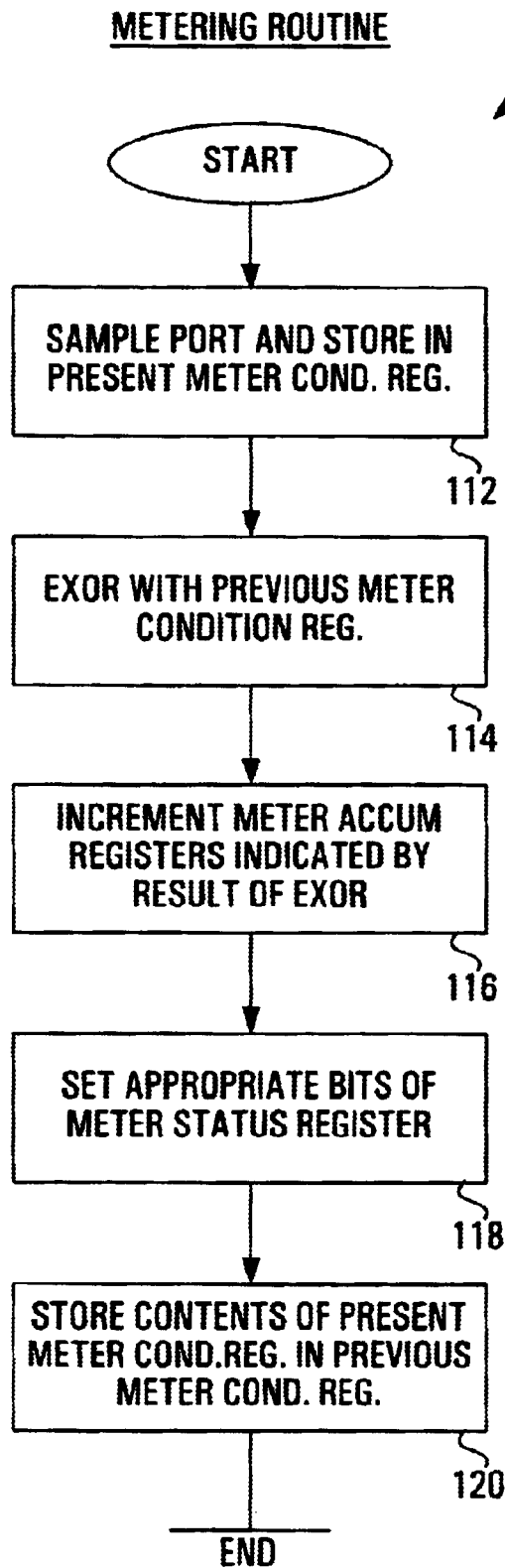
FIG. 4 is a flow chart of a metering routine executed by a processing circuit of the metering system.
Figure 5:
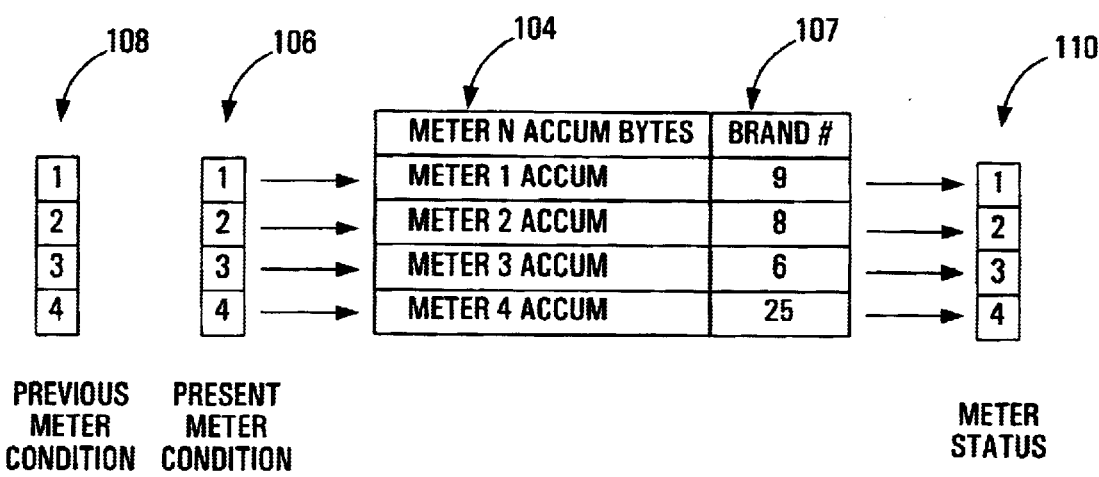
FIG. 5 is a schematic representation of memory registers accessible by the processing circuit of the metering system.

Referring to FIGS. 2, 4 and 5 the metering routine 100 directs the processing circuit 62 to maintain an accumulated total amount dispensed for each of the draft beer dispensers 42 in the corresponding meter accumulator registers 104, and also directs the processing circuit to maintain a byte in the meter status register 110 whose contents indicate to the variance controller 48 which of the accumulated totals have changed. The metering routine 100 begins with a first block of codes 112 which direct the processing circuit 62 to read the first I/O port 70 and store the byte so read in the present meter condition register 106. Block 114 then directs the processing circuit to perform an EXOR operation on the contents of the present meter condition register 106 and the contents of the previous meter register 108 to produce an EXOR byte, the bit positions of which hold bits indicating which of the four meters displays a different condition than that previously read. Using this information, block 116 directs the processing circuit to increment the meter accumulator registers 104 associated with the meters identified by the bits set in the EXOR byte.

To increment each of the meter accumulator registers 104, the processing circuit reads- the contents of the meter accumulator register 104, retrieves the calibration values stored in the corresponding calibration registers 102 and adds the calibration value to the contents of the corresponding meter accumulator register 104 which is to be incremented. After completing this task, the result so achieved is stored in the corresponding meter accumulator register. Thus the meter accumulator registers hold values representing the volume of beer which has passed through the flow meter 78.

Block 118 directs the processing circuit to set a corresponding bit of the meter status register 110 such that the meter status register holds a byte indicating which of the meter accumulator registers have been incremented.

Block 120 then directs the processing circuit to store the contents of the present meter condition register 106 in the previous meter condition register 108, at which time the metering routine 100 is ended.

Referring to FIG. 5, each of the meter accumulator registers 104 further includes a brand number field 107, which stores a brand number associated with the brand of beer dispensed through the corresponding meter.

It will be appreciated that in order to accurately measure the dispensation of beer in the above manner, the first I/O port 70 is sampled at block 112 at least twice per revolution of the magnet 90 in the space 84 of the cavity 80, shown in FIG. 3. In this embodiment, the metering routine is invoked again in 1/100th of a second such that this routine is executed 100 times per second.

Referring back to FIG. 2, the program memory 65 further includes a receive communications routine 103. The receive communications routine is executed every 1/100th of a second and directs the processing circuit 62 to read the second I/O port 72.

Figure 6:
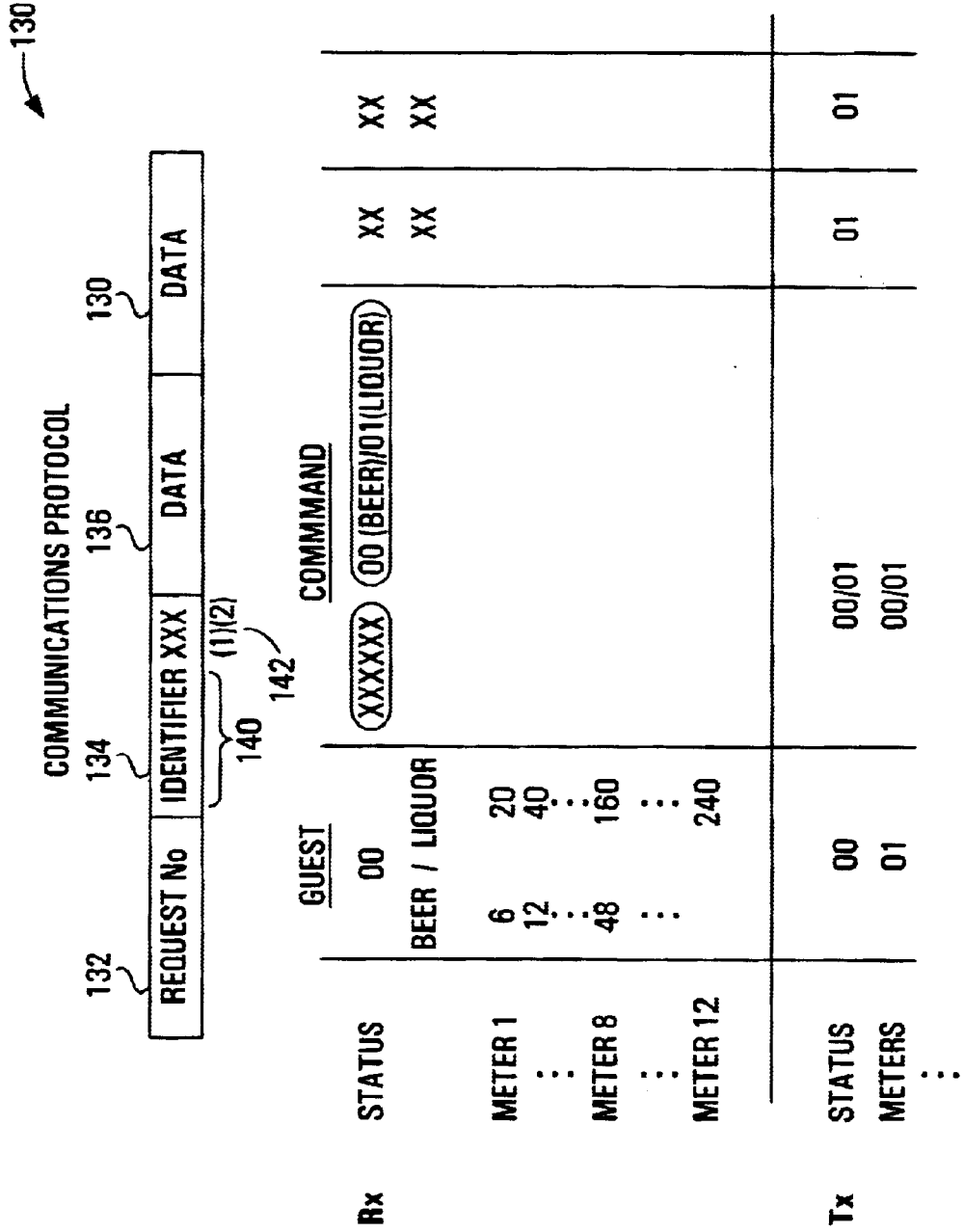
FIG. 6 is a schematic representation of a communications protocol employed by the metering system to communicate with other devices in the system of FIG. 1.

Referring to FIG. 6, communications between the metering system and the variance controller are effected according to a communications protocol shown generally at 130. The communications protocol includes a four-byte data packet including a request byte 132, an identifier byte 134 and first and second data bytes 136 and 138. The request byte 132 is used to hold the value 00 to indicate a status request, or other numbers to represent different meters available on the draft beer dispensers and the metered liquor dispensing system.

The identifier byte 134 includes a first plurality of bits 140 representing a command and a second plurality of bits 142 for identifying whether the packet 130 is directed to the metering system or the metered liquor dispensing system 44. The data bytes 136 and 138 are used to hold data to be sent to or read from the metering system or the metered liquor dispenser.

Figure 7:
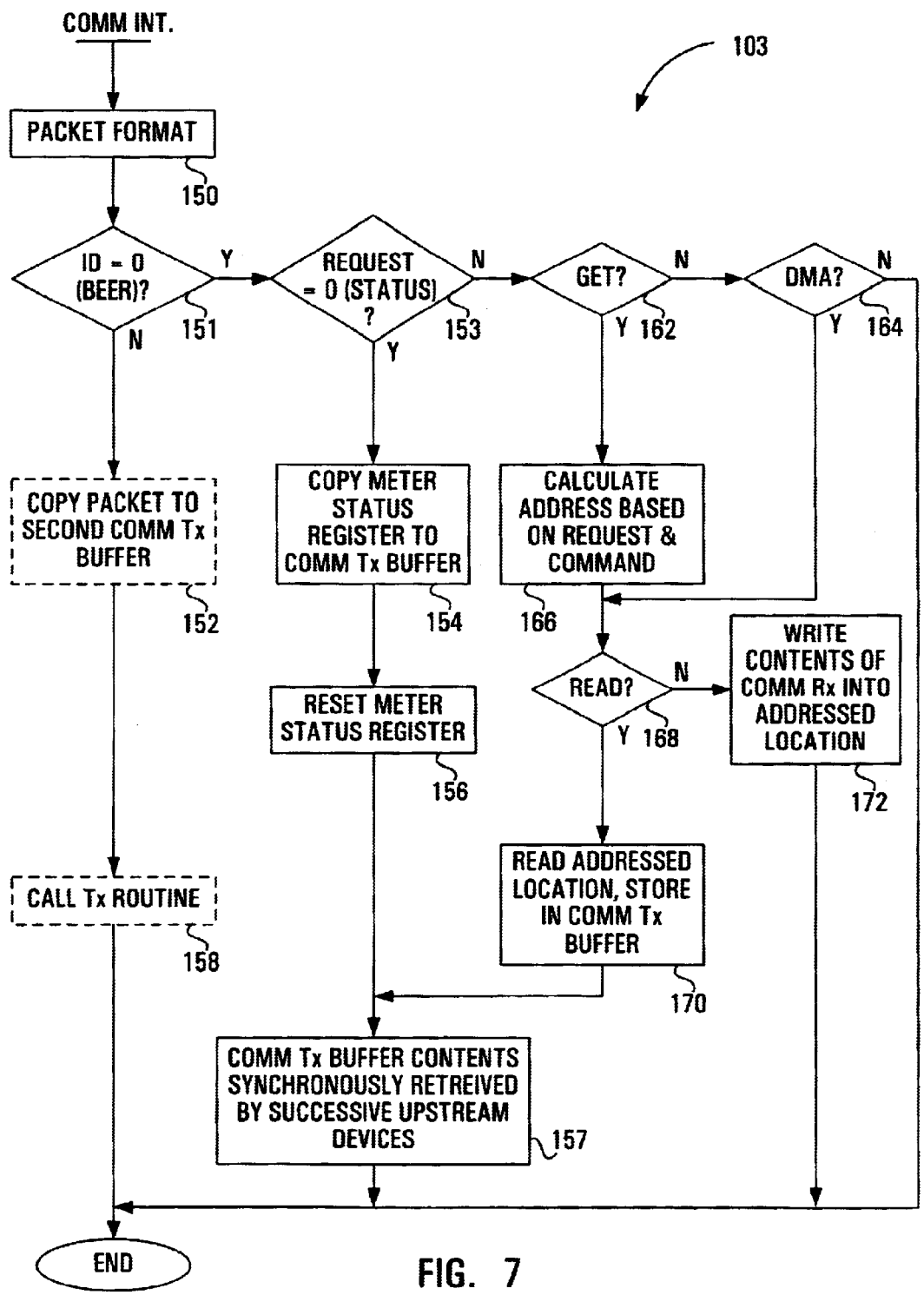
FIG. 7 is a flow chart of a receive communications routine executed by the processing circuit of the metering system.

Referring to FIGS. 2, 6 and 7, the receive communications routine is shown generally at 103 and directs the processing circuit 62 to respond to a status request from the variance controller 48 by effectively transmitting the contents of the meter status register 110 to indicate which of the accumulated totals of dispensed beer (i.e. the bytes in the meter accumulator registers 104) have changed, and to respond to subsequent requests from the variance controller pertaining to specific beer dispensers by effectively transmitting the contents of the corresponding meter accumulator register 104 and brand number field 107.

The receive communications routine is invoked when a four byte packet is received at the second I/O port 72 shown in FIG. 2. The receive communications routine begins with a first block 150 which directs the processing circuit 62 to format the packet received at the communications port. This includes error checking and other conventional communications practices required to ensure error-free receipt of a four-byte packet on the communications network 39 used in the system.

After formatting the packet, the processing circuit is directed to block 151 where it reads the identifier bits 142 of the identifier byte 134. If the identifier bits are not equal to a predetermined value associated with the metering system 60, in this case, the value 0, the receive communications routine is ended.

If the bits 142 of the identifier byte 134 are equal to the predetermined value associated with the beer metering system 60, block 153 directs the processing circuit to read the request byte 132 to determine whether the request is a status request or not. If the request is a status request, block 154 directs the processing circuit to copy the contents of the meter status register 110 shown in FIG. 5 to the communications transmit buffer 113. Block 156 then directs the processing circuit to reset the contents of the meter status register to 0. As illustrated at block 157, once the appropriate data has been copied at block 154 to the communications transmit buffer 113, the data is synchronously retrieved by the next upstream device, via the second I/O port 72 which is a duplex serial communications port, in response to a clock pulse on the network 39. In this embodiment, the next upstream device is a liquor system controller 212 shown in FIG. 1. Once such data is retrieved by the liquor system controller 212, it will then be synchronously retrieved from the liquor system controller by the next upstream device, which in this embodiment is the variance controller 48, in response to a subsequent clock pulse. Thus, synchronous retrieval of the data stored in the communications transmit buffer 113 by successive upstream devices serves as a functional substitute for actively transmitting such data upstream to the variance controller. Such synchronous retrieval eliminates the need for communications interrupts for communications in the upstream direction, resulting in more efficient processing, since only downstream transmissions will generate communications interrupts. It will therefore be appreciated that block 157 does not direct the processing circuit 62 to perform any such active upstream transmission; block 157 has been included in FIG. 7 only for the sake of clarity, to emphasize the subsequent upstream movement and arrival at the variance controller 48 of the data which has been copied to the communications transmit buffer 113. The receive communications routine is then ended.

If at block 153, the request byte 132 is non-zero, the processing circuit is directed to block 162 which directs the processing circuit to determine whether the command bits 140 of the identifier byte 134 shown in FIG. 6 are a GET command. If it is not a GET command, the processing circuit is directed to block 164 where it determines whether or not command bits 140 indicate a direct memory access (DMA) command. If such bits do not represent a DMA command, the receive communications routine is ended.

If at block 162, the command bits 140 represent a GET command, block 166 directs the processing circuit to determine which of the meter accumulator registers 104 is to be addressed, based on the request byte 132 and the command bits 140. Block 168 then directs the processing circuit to determine from the command bits 140 whether or not the command is a read command, and if so, block 170 directs the processing circuit to read and store the contents of the addressed meter accumulator register 104 in the communications transmit buffer 113. As illustrated at block 157, the contents of the communications transmit buffer 113 are then synchronously retrieved by successive upstream devices, i.e., in this embodiment, such contents are synchronously retrieved by the liquor system controller 212 and then by the variance controller 48, in response to successive clock pulses on the network 39, as discussed earlier. The receive communications routine is then ended.

If the command at block 168 is not a read command, i.e. it is a write command, block 172 directs the processing circuit to write the contents of the data bytes in the communications receive buffer 111 into the addressed location and the routine is ended.

If at block 164, the request byte 132 indicates that the command is a direct memory access command, the processing circuit 62 is directed to block 168, using the contents of the identifier byte 134 to represent the address of the memory location which is to be addressed by the processing circuit 62 for reading or writing according to blocks 170 or 172.

Thus it will be appreciated that the metering system 60 is able to receive data packets representing requests for information and is able to respond to such requests by, in effect, transmitting response packets on the network 39 representing a response to the request received. In particular, the variance controller 48 can send requests to the metering system 60 and can receive back from the metering system an indication of which draft beer dispensers have been actuated and/or a value representing the total amount of beer dispensed from any desired dispenser. In this manner, the variance controller 48 can monitor dispensed amounts of beer at each beer dispenser.

Liquor System

Referring back to FIG. 1, the metered liquor dispensing system shown generally at 44 includes a bartender's liquor dispensing gun, shown generally at 200, having a housing 202 on which is mounted a keypad 204 for receiving input by the bartender to select a particular size and type or brand of liquor. The housing also includes a dispensing nozzle 206 and a plurality of individual conduits 208 in communication with the nozzle 206. Mounted within the liquor system controller 212 are a plurality of valves 210 which control the flow of liquor along the conduits 208 to the nozzle 206. The keypad 204 and the valves 210 are connected to the liquor system controller 212 by a communications line 214. Essentially, in response to actuation of the keypad 204 by an operator of the liquor gun 200, the liquor system controller 212 determines which key on the keypad 204 has been actuated and, in response, actuates a corresponding valve 210 in order to allow liquor to flow through a corresponding conduit 208 to the nozzle 206. The valve 210 is kept open to allow a pre-determined volume of liquor to be dispensed from the nozzle 206 over a pre-determined period of time after the key is depressed.

The liquor system controller 212 keeps track of which valves have been opened and the respective times during which such valves remain open to produce a value indicating the volume or amount of each liquor dispensed through the nozzle 206.

Figure 8:
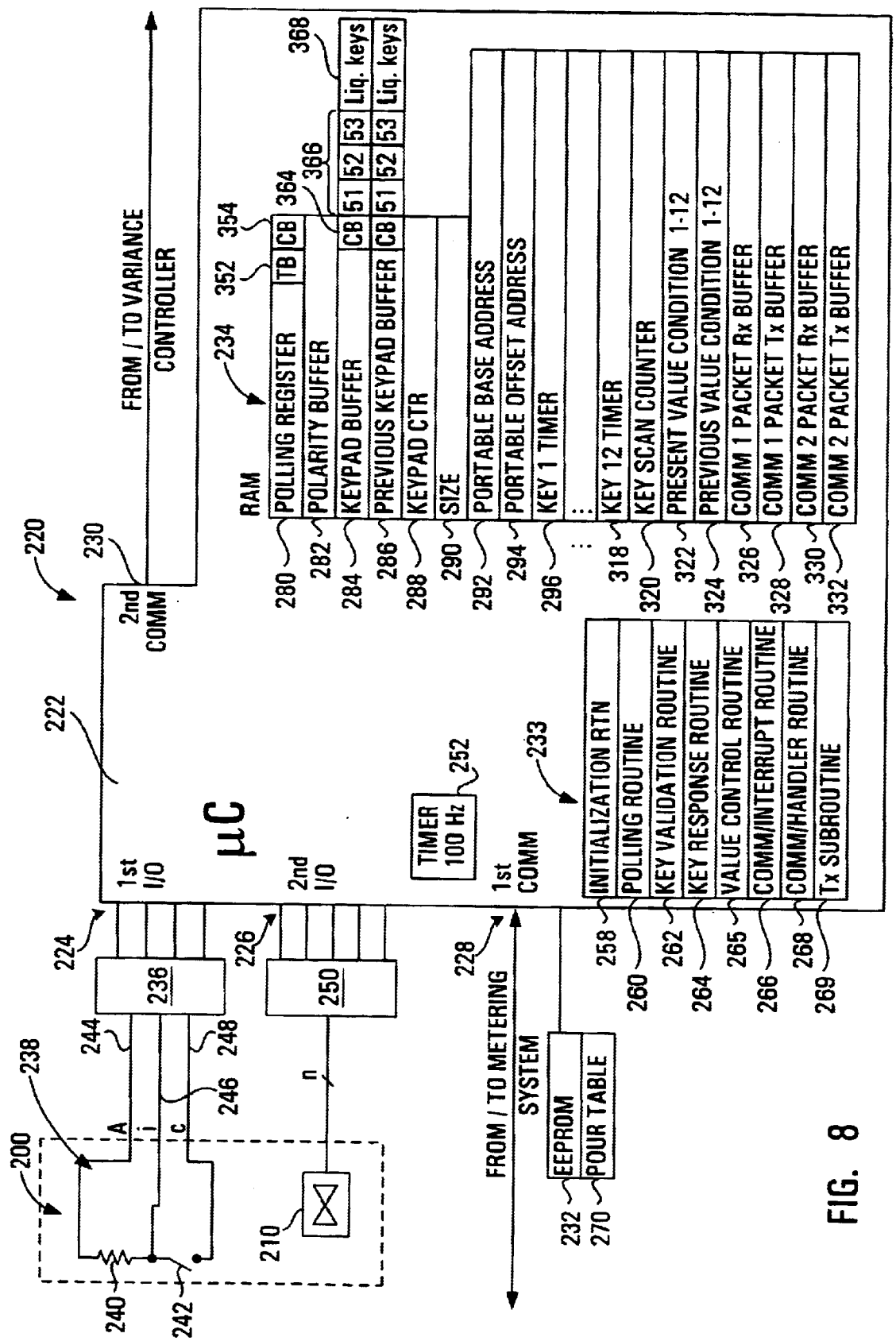
FIG. 8 is a block diagram of a liquor system controller shown in FIG. 1.

Referring to FIG. 8, the liquor system controller 212 includes a processing circuit shown generally at 220. The processing circuit 220 includes a microcontroller 222 which in this embodiment is a PIC 16F84. The microcontroller has first and second I/O ports shown generally at 224 and 226 respectively, a first communications port 228 and a second communications port 230.

The microcontroller 222 is in communication with an EEPROM memory 232. The microcontroller has internal program memory 233 and integral random access memory (RAM) 234.

The first I/O port 224 is connected to an interface circuit 236 which, in this embodiment, includes a plurality of shift registers for addressing each switch in the key matrix in the liquor gun 200. A representative single key equivalent circuit is shown generally at 238 and includes a resistor 240 in series with switch contacts 242 actuated by depressing a corresponding key on the liquor gun 200. The resistor 240 is connected to an active signal line 244 and is further connected at an opposite end to a sense signal line 246. The sense signal line 246 is also connected to a first contact of the switch contacts 242 and a common signal line 248 is connected to a second contact of the switch contacts 242. Effectively, in response to signals produced by the microcontroller 222 at the first I/O port 224, the interface circuit 236 places a potential difference of a first polarity across signal lines 244 and 248. For example, if active signal line 244 is of a higher potential than common signal line 248, when the switch contacts 242 are open the sense signal line 246 indicates a high voltage level. Conversely, when the switch contacts 242 are closed the sense signal line 246 indicates a low voltage level. This high and low voltage level so sensed is transferred by the interface circuit 236 to the first I/O port 224 for reading by the microcontroller.

When the polarity is reversed, common signal line 248 has a higher potential than active signal line 244, in which case when the switch contacts 242 are open, the sense signal line 246 has a low voltage and when the switch contacts 242 are closed, the sense signal line has a high voltage.

The microcontroller is programmed to alternate the polarity of the potential across signal lines 244 and 248 so that when current flows through the switch contacts 242, it flows in successively alternating directions. This provides an advantage in that if the switch contacts 242 are exposed to a salty aqueous environment, electrolysis in any particular direction across the contacts is minimized. It has been found that the switch contacts can be immersed in water for long periods of time without degrading the reliability of the operation of the circuit.

The second I/O port 226 is connected to a second interface circuit 250 for connecting the second I/O port 226 to the plurality of valves shown generally at 210. In general, the microcontroller is operable to write a bit pattern to the second I/O port 226, the bit pattern establishing which of the valves 210 is to be actuated to allow fluid to flow therethrough.

The first and second communications ports 228 and 230 are similar. The first communications port 228 is connected to the metering system 60 for transmitting messages to and retrieving messages from the metering system 60 shown in FIG. 1.

The second communications port 230 is connected to the variance controller 48 for receiving messages from and effectively transmitting messages to the variance controller 48.

The microcontroller further includes a timer 252 having a period of 0.01 seconds. The timer loads a timer bit in the timer register each 0.01 seconds.

The program memory 233 is programmed with codes for directing the processing circuit 220 to execute an initialization routine 258, a polling routine 260, a key validation routine 262, a key response routine 264, a valve control routine 265, a communications interrupt routine 266, and a communications handler routine 268. The EEPROM 232 includes a pour table 270.

The initialization routine 258 directs the processing circuit 220 to establish in the RAM 234 a polling register 280, a polarity buffer 282, a keypad buffer 284, a previous keypad buffer 286, a keypad counter register 288, a size register 290, a pour table base address register 292, a pour table offset address register 294, twelve key timer registers 296 through 318, a keyscan counter 320, a present valve condition register 322, a previous valve condition register 324, a COMM 1 packet receive buffer 326, a COMM 1 packet transmit buffer 328, a COMM 2 packet receive buffer 330 and a COMM 2 packet transmit buffer 332 for manipulation by the remaining routines stored in the program memory 233.

Figure 9:
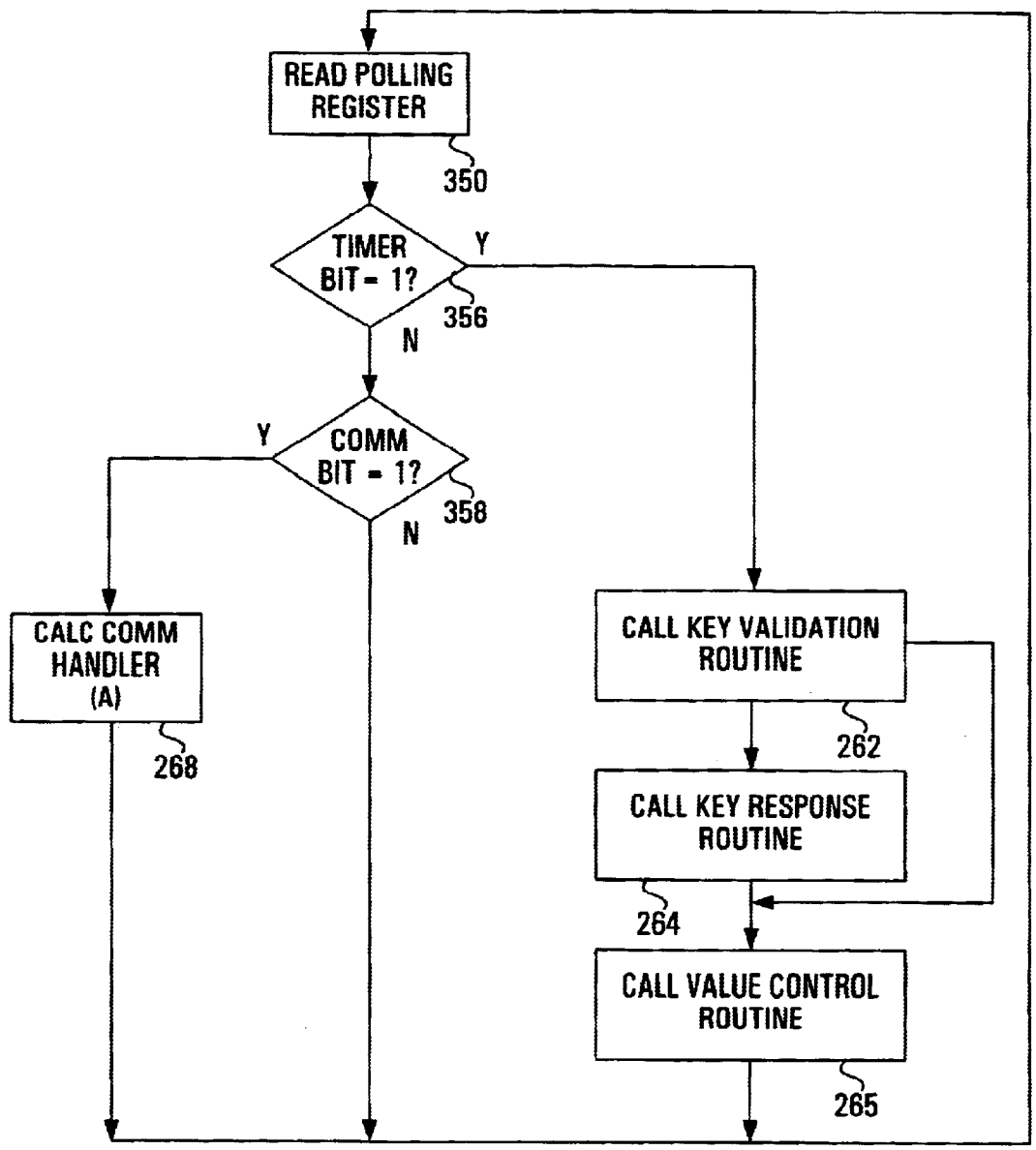
FIG. 9 is a flow chart of a polling routine executed by a processing circuit in the liquor system controller.

Referring to FIGS. 8 and 9, the polling routine 260 directs the processing circuit 220 to call the key validation routine 262 to determine whether any new keys on the liquor gun 200 have been pressed, and if necessary, to call the key response routine 264. If it is not necessary to call the key response routine, the processing circuit is directed to proceed directly to the valve control routine 265 to determine whether any of the liquor valves should be closed. In this embodiment, the key validation routine and the valve control routine are called 100 times per second. The polling routine 260 also directs the processing circuit to continuously check for a communications interrupt indicating that a new message has been received on the network 39, and to call the communications handler routine if a new message is detected.

The polling routine 260 includes a first block 350 which directs the processing circuit 220 to read the polling register 280. Referring to FIG. 8, the polling register includes first and second bit positions 352 and 354, the first bit position for holding the timer bit set by the timer 252 and the second bit position 354 for holding a communications bit set by the communications interrupt routine 266 in response to receipt of a message at the second communications port 230.

Block 356 then directs the processing circuit 220 to determine whether the timer bit in bit position 352 is active and if so, directs the processing circuit to execute the key validation routine 262. After completion of the key validation routine, the polling routine directs the processing circuit to call the key response routine 264 followed by a call to the valve control routine 265. In essence, therefore, in response to an active timer bit, which occurs each $\frac{1}{100}$th of a second, the key validation routine 262, the key response routine 264 if necessary, and the valve control routine 265 are all executed.

If at block 356, the processing circuit 220 determines that the timer bit in bit position 352 is not equal to one, block 358 directs the processing circuit to read the communications bit stored in the second bit position 354 of the polling register 280 and if such bit is active the processing circuit is directed to the communications handler routine 268. Alternatively, if the communications bit is not set active the processing circuit is directed back to block 350 to execute the functions as described above. Effectively, the polling routine initiates communications with the liquor gun 200 on a periodic basis and responds to communications received at the second communications port 230.

Figure 10:
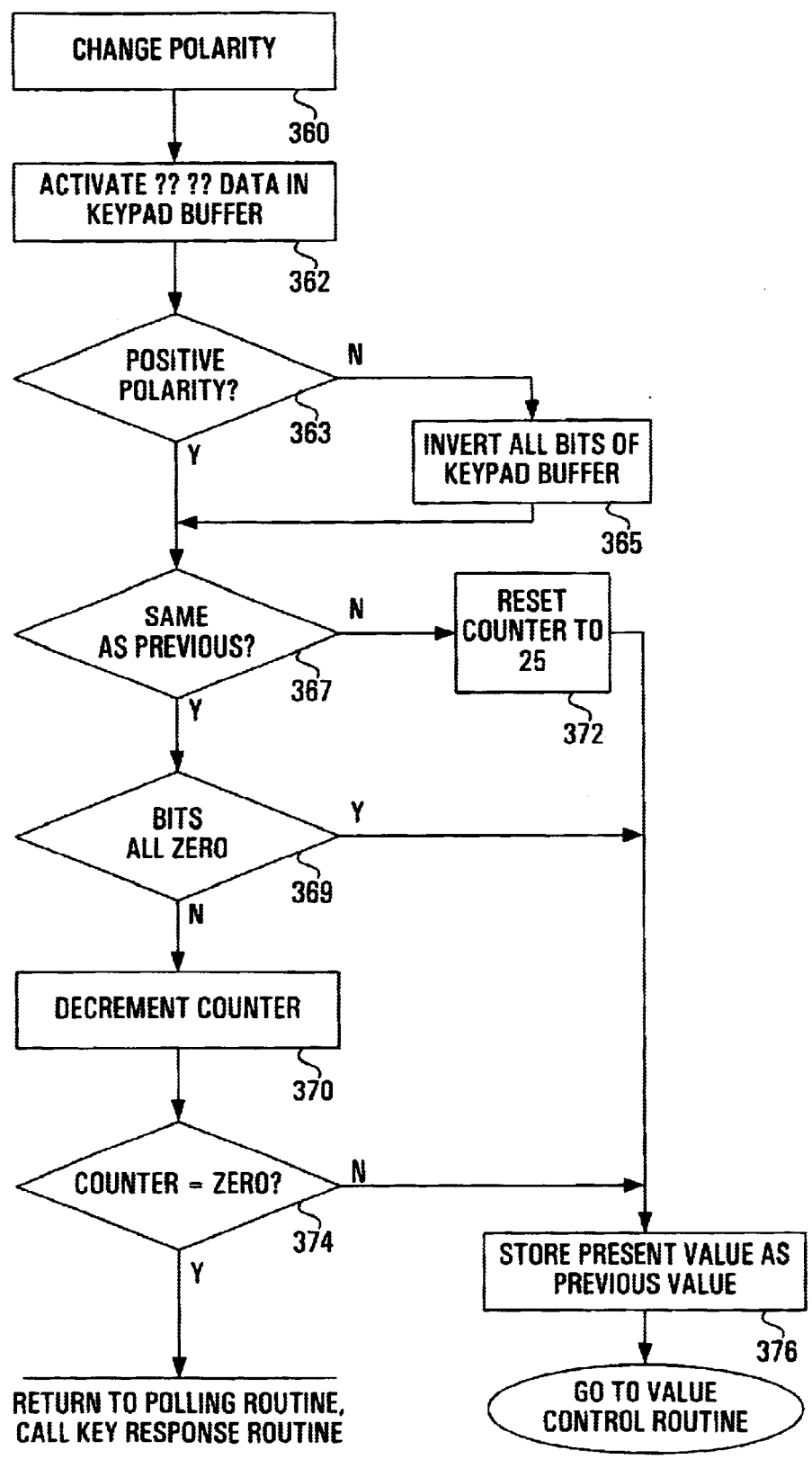
FIG. 10 is a flow chart of a key validation routine run by the processing circuit of the liquor system controller.

Referring to FIGS. 8 and 10, the key validation routine is shown generally at 262. The key validation routine directs the processing circuit 220 to determine whether any of the keys on the keypad 204 of the liquor gun 200 have been pressed for at least one quarter of one second, and if so, to call the key response routine 264.

The key validation routine 262 includes a first block 360 which directs the processing circuit 220 to write to the first I/O port 224 to change the polarity of the potential appearing across the active and common signal lines 244 and 248. Since the key validation routine is invoked each $\frac{1}{100}$th of a second, the polarity on the active and common signal lines 244 and 248 is reversed at a frequency of 50 Hz. For this description, a positive polarity is deemed to occur when the active signal line 244 is at a lower potential than the common signal line 248. A bit indicating such positive polarity is stored in the polarity buffer 282. However, each time the polarity changes, block 360 directs the processing circuit to write a corresponding bit into the polarity buffer to indicate positive or negative polarity.

After changing the polarity, block 362 directs the processing circuit 220 to activate the first I/O port 224 to control the interface circuit 236 to scan the keypad matrix at the liquor gun 200 and to present to the first I/O port 224 two bytes indicating the status of the keys pressed at the keypad. These bytes are read at the first I/O port by the processing circuit and stored in the keypad buffer 284. The keypad buffer includes a plurality of bit positions for holding a power bit 364, three size bits 366 and twelve individual liquor key bits 368. An active bit in any of these bit positions indicates that the corresponding key has been actuated.

The processing circuit 220 is then directed to block 363 where it is directed to read the contents of the polarity buffer 282 to determine whether the switches are energized with positive or negative polarity. If the switches are energized with negative polarity, block 365 directs the processing circuit to invert all bits of the keypad buffer 284. After such bits have been inverted, or if the contents of the polarity buffer indicate positive polarity, the processing circuit is directed to block 367 where it reads the contents of the previous keypad buffer 286 and compares such contents against the contents of the keypad buffer 284.

If, at block 367, the contents of the keypad buffer 284 are not equal to the contents of the previous keypad buffer 286, then the state of one of the keys has changed in the last 1/100th of a second, but any key presses are not yet considered valid. Block 372 directs the processing circuit to reset the contents of the keypad counter register 288 to 25. Block 376 directs the processing circuit to copy the contents of the keypad buffer 284 to the previous keypad buffer 286, and directs the processing circuit to the valve control routine 265.

If, at block 367, the contents of the keypad buffer 284 and the previous keypad buffer 286 are equal, then there has been no change in the status of the size keys or individual liquor keys in the last 1/100th of a second. This could arise either if no keys have been pressed for at least the last 1/100th of a second, or alternatively, if one of the keys has been pressed and held down for at least the last 1/100th of a second. The processing circuit is then directed to block 369, which directs the processor to determine whether the three size bits 366 and twelve individual liquor key bits 368 are all equal to zero. If these fifteen bits are all equal to zero, then block 376 directs the processing circuit to copy the contents of the keypad buffer 284 to the previous keypad buffer 286, and directs the processing circuit to the valve control routine 265. Thus, the check at block 369 avoids unnecessarily calling the key response routine merely because all keys have remained inactive (i.e. no keys have been pressed) for a quarter of a second.

If, at block 369, it is determined that the size bits 366 and individual liquor key bits 368 are not all zero, then it has been determined that a key has remained pressed for a further 1/100th of a second since the last invocation of the key validation routine. Accordingly, block 370 directs the processing circuit to decrement the contents of the keypad counter register 288.

After decrementing the counter at block 370, block 374 directs the processing circuit to determine whether the contents of the keypad counter register 288 are equal to zero. If not, the processing circuit is directed to block 376 where it copies the contents of the keypad buffer 284 into the previous keypad buffer 286. The processing circuit is then directed to the valve control routine 265.

If, after executing block 374, the contents of the keypad counter register 288 are equal to zero, the processing circuit has determined that a key has been depressed for one quarter of a second and this is deemed to be sufficient time to debounce the key so depressed. It will be appreciated that such debouncing prevents false indications that a key has been depressed. Such false indications might otherwise arise, for example, as a result of electromagnetic interference from nearby electrical devices. Thus, the indication of a depressed key may be considered a reliable indication, and the processing circuit is directed to the key response routine 264 shown in FIG. 11.

Figure 11:
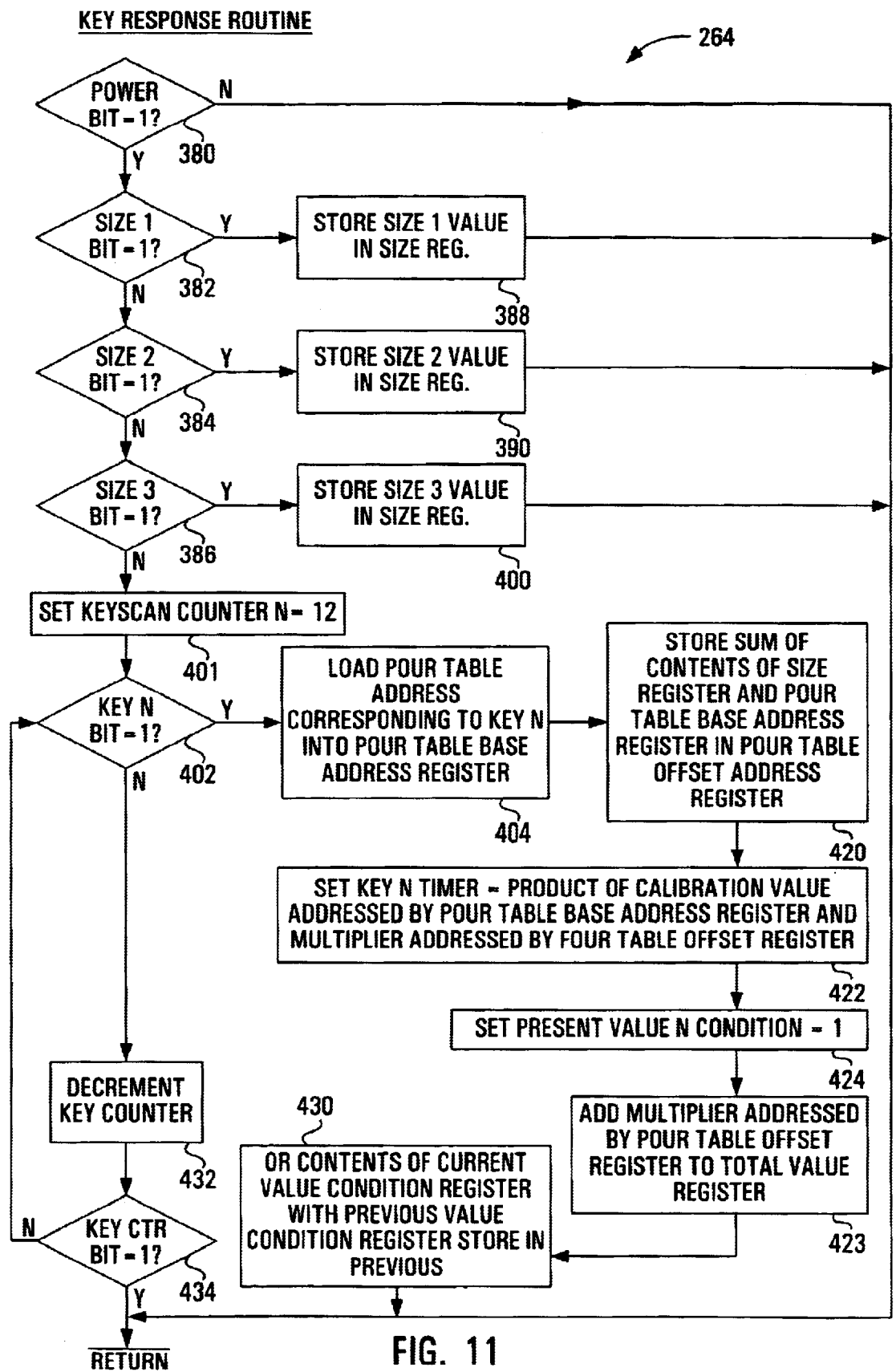
FIG. 11 is a flow chart of a key response routine run by the processing circuit of the liquor system controller.

Referring to FIGS. 8 and 11, the key response routine is shown generally at 264. The key response routine directs the processing circuit 220 to store an appropriate size value in the size register 290 if the newly pressed key on the liquor gun 200 is a size key, and directs the processing circuit to open a liquor valve for a calculated time period if the newly pressed key on the liquor gun is a liquor key. The key response routine also directs the processing circuit to maintain bytes in the previous valve condition register 324 whose bits indicate whether any of the liquor valves have been opened since the last status request from the variance controller 48.

The key response routine begins with a first block 380 which checks the power bit 364 in the keypad buffer to determine whether the bit is set to one. If the bit is not set to one, the key response routine is immediately ended. If it is set to one, the processing circuit is directed to blocks 382, 384 and 386 which direct the processing circuit to determine the status of the size bits 366 in the keypad buffer and if any of the size bits are set, corresponding blocks 388, 390 or 400 store a corresponding size value in the size register 290. After storing such size value, the key response routine is ended.

If, after checking the size bits at blocks 382, 384 and 386, none of them has been set, the processing circuit is directed to block 401, where it sets the keyscan counter 320 equal to 12, and block 402 directs the processing circuit to read the individual liquor key bits 368 in the keypad buffer 284 to determine whether the bit corresponding to the first liquor key, key twelve, is set.

If the key twelve liquor key bit is set, block 404 directs the processing circuit to load into the pour table base address register 292 a fixed value identifying a base address of a pour subtable associated with the key.

Figure 12:
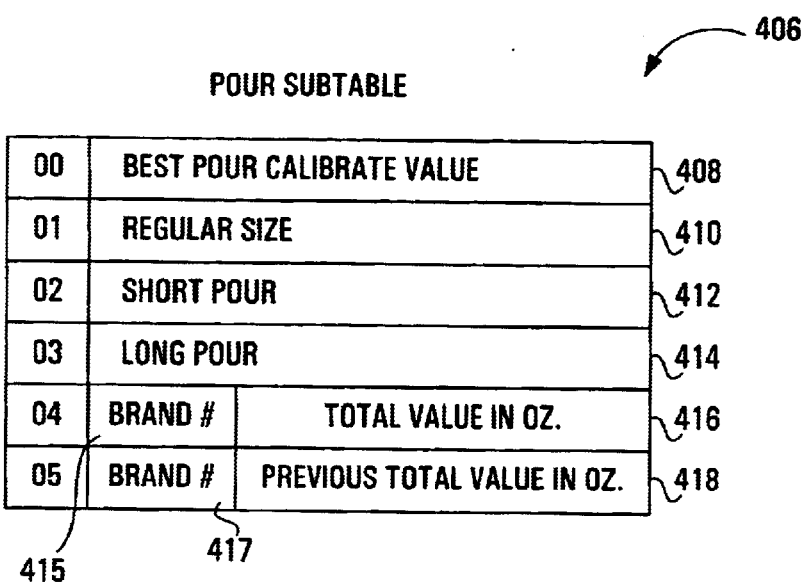
FIG. 12 is a schematic representation of memory registers accessible by the processing circuit of the liquor system controller.

Referring to FIG. 12, a representative pour subtable corresponding to a particular key is shown generally at 406 and includes a base pour calibration register 408 at the base address in the subtable, for storing a base pour calibration number representing an amount of time required to pour one ounce of the liquor associated with the particular key. The pour subtable further includes a regular size register 410 located at a first offset location from the base address, to hold a value representing a multiplication factor, by which the calibration value stored in the base pour calibration register 408 is to be multiplied, in order to determine a time value during which the valve is to remain open to pour a regular sized drink. For example, if the regular sized drink of the liquor associated with the particular key is one-half ounce, then the multiplication factor stored in the regular sized register would equal 0.5. The pour table further includes a short pour register 412 located at a second offset address from the base address for storing a multiplication factor such as 0.25, for example, for defining a short pour such as ¼ ounce in this example, for a lighter drink or a drink with numerous ingredients. The pour table further includes a long pour register 414 at a third offset address from the base address for holding a multiplication factor such as one, for example, for defining a long pour value such as one ounce in this example. The pour table further includes a brand number field 415 and a corresponding total value in ounces register 416 stored at a fourth offset address from the base address, and a brand number field 417 and a corresponding previous total value register 418 at a fifth offset address from the base address. In this embodiment, the previous total value register 418 is used to store a previous total for backup purposes, and may be updated at any desired time.

Referring back to FIGS. 8 and 11, after setting the contents of the pour table base address register 292, block 420 directs the processing circuit to add the contents of the size register 290 to the contents of the pour table base address register 292 to produce a pour table offset address which is stored in the pour table offset address register 294. Thus, the pour table base address register holds the base address of the pour table and thus points to the base pour calibration register 408. The pour table offset address points to the regular size register 410, short pour register 412 or long pour register 414 as determined by the contents of the size register 290.

After storing the pour table base and offset addresses in the above registers, block 422 directs the processing circuit to multiply the base pour calibration value stored in the pour table base pour calibration register 408 with the contents of the register identified by the pour table offset address register 294, for example, the contents of the short pour register 412, to produce a timer value. This timer value is loaded into the key twelve timer register 318. At block 424, the corresponding bit in the present valve condition register 322 is set active. Upon setting active the bit in the present valve condition register, the processing circuit 220 automatically writes to the second I/O port 226 to direct the second interface circuit 250 to open the corresponding valve 210 to allow fluid to flow through the liquor gun 200.

Block 428 directs the processing circuit to add the contents of the register identified by the pour table offset address register 294, which represents an amount in ounces of the fluid which will be dispensed in response to the key press, to the total value in ounces register 416.

Block 430 then directs the processing circuit to OR the contents of the present valve condition register 322 with the contents of the previous valve condition register 324 and store the result of the OR operation in the previous valve condition register 324, so that the previous valve condition register will hold bits indicating which of the twelve valves have been actuated. The key response routine 264 is then ended.

If at block 402, the first key (key twelve) has not been actuated, the processing circuit 220 is directed to block 432, which instructs the processing circuit to decrement the keyscan counter 320. If, at block 434, the keyscan counter 320 has been decremented to zero, the key response routine 264 is ended. Otherwise, processing is directed to block 402, to determine whether the bit in keypad buffer 284 corresponding to the next key has been set active.

Thus, the process shown in blocks 402 to 430 is performed for each successive key until all twelve liquor keys have been tested. It will be appreciated that accordingly, the appropriate key timer register for each key is loaded with a particular value if the key is actuated and the corresponding bit in the present valve condition register is set active if it did not already indicate that the corresponding valve had been actuated.

Figure 13:
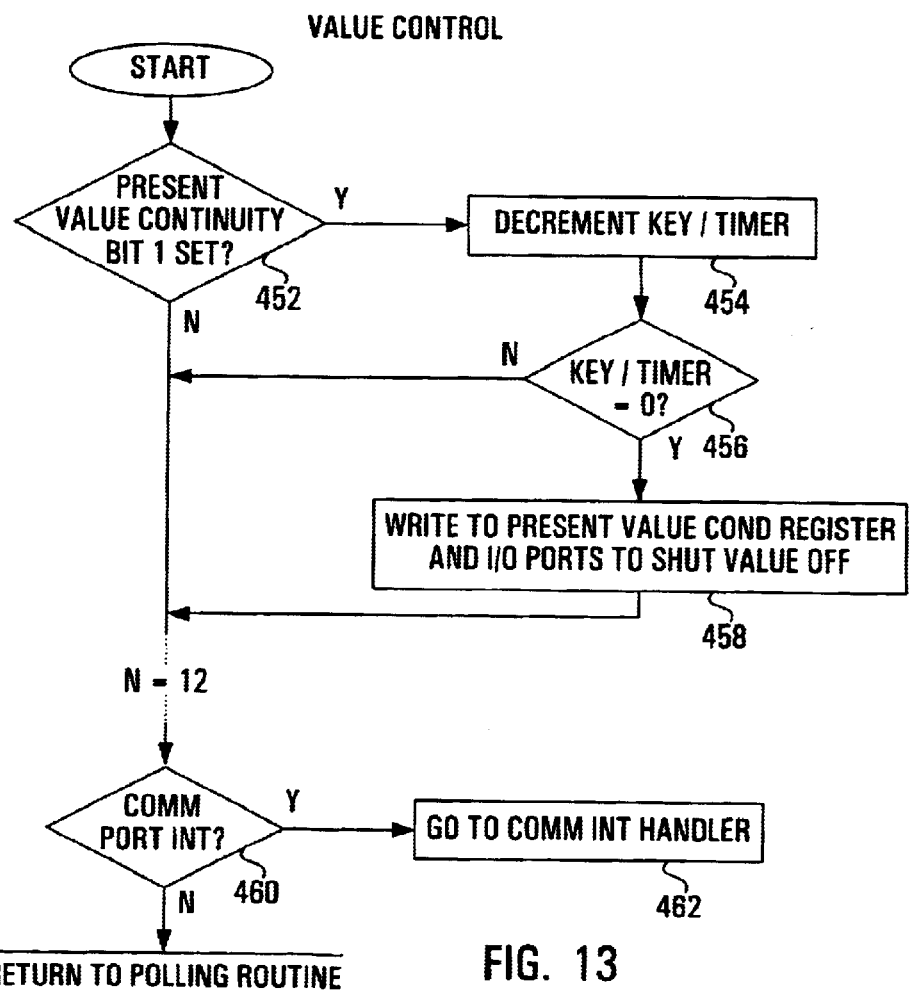
FIG. 13 is a flow chart of a valve control routine run by the processing circuit of the liquor system controller.

Referring to FIGS. 8 and 13, the valve control routine is shown generally at 265. The valve control routine directs the processing circuit 220 determine which of the liquor valves are currently open, to decrement the corresponding key timer for each open valve, and to close the valve when the corresponding key timer is decremented to zero. The valve control routine also directs the processing circuit 220 to check for a communications interrupt indicating that a new message has been received. The valve control routine begins with a first block 452 which directs the processing circuit 220 to read the contents of the present valve condition register 322 beginning with the bit corresponding to key one. If this bit is set active, block 454 directs the processing circuit to decrement the contents of the key one timer register 296. Block 456 then directs the processing circuit to determine whether the contents of the key one timer register are equal to zero and if such contents are equal to zero, block 458 directs the processing circuit to write an inactive value, in this case zero, to the corresponding bit position in the present valve condition register 322 and to write to the second I/O port 226 to cause the second interface circuit 250 to shut off the corresponding valve.

If at block 456, the contents of the key one timer register 296 are not equal to zero, the processing circuit is directed to perform the same sequence of events for the next bit in the present valve condition register 322. In effect therefore, blocks 452, 454, 456 and 458 are repeated for each bit in the present valve condition register 322. After performing the above tests on each of the twelve bits in the present valve condition register 322, the processing circuit is directed to block 460 to read the communications bit stored in the second bit position 354 of the polling register 280 to determine whether a communications port interrupt has occurred. If such an interrupt has occurred, block 462 directs the processing circuit to the communications handler routine 268, shown in FIG. 15.

Figure 14:
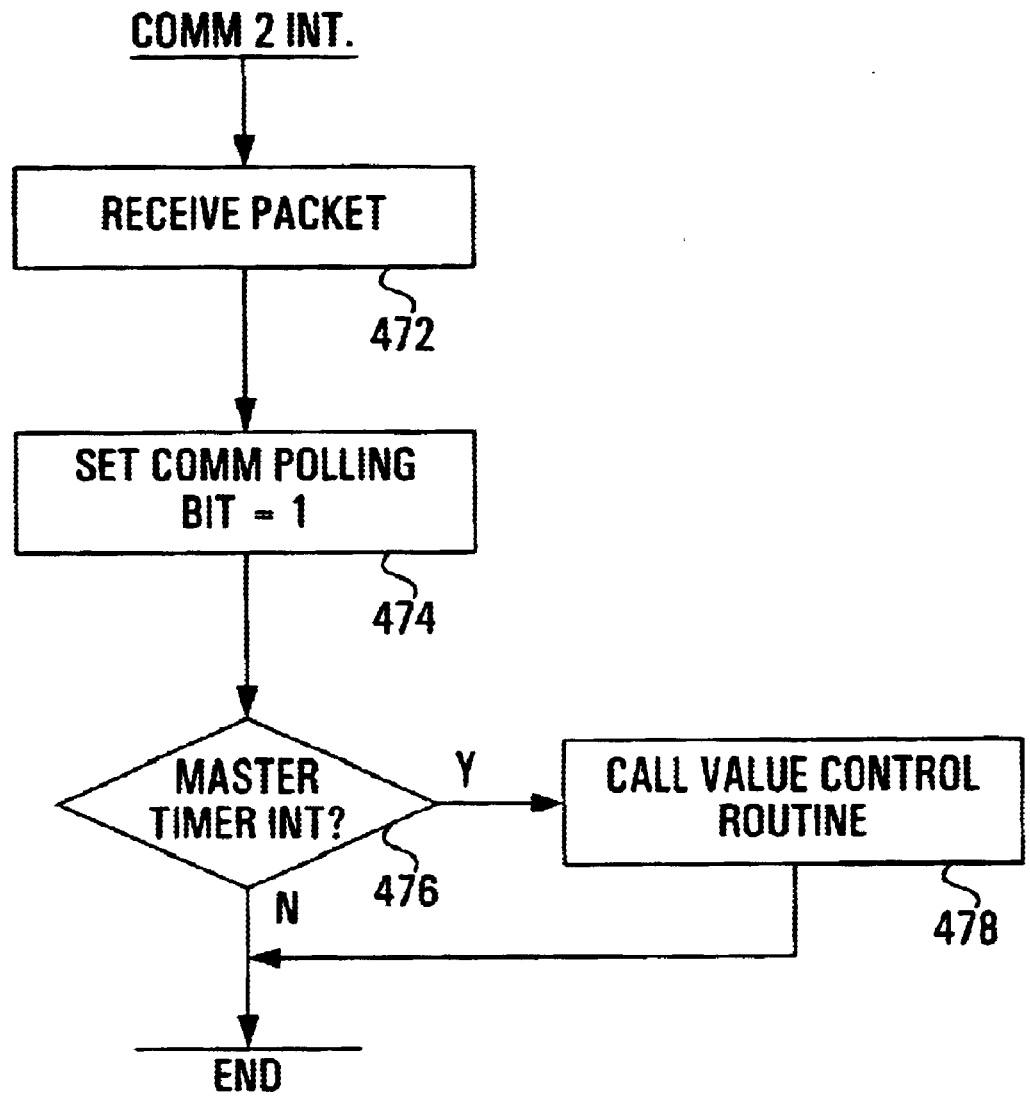
FIG. 14 is a communications interrupt routine run by the processing circuit of the liquor system controller.

Referring to FIGS. 8 and 14, the communications interrupt routine is shown generally at 266. The communications interrupt routine directs the processing circuit to respond to receipt of a message at the second communications port, to receive the message, and to set a communications bit in the second bit position 354 to subsequently direct the processing circuit, in carrying out the polling routine 260 shown in FIG. 9, to call the communications handler routine 268.

The communications interrupt routine begins with a first block 472 which directs the processing circuit to carry out the appropriate functions of verifying that a proper data packet has been received at the port. Such verification is routine and essentially the receive packet block 472 serves to store in the COMM 2 packet receive buffer 330 the four byte packet so received at the corresponding port.

After receiving the four byte data packet as appropriate, block 474 directs the processing circuit to set active the communications bit in the second bit position 354 in the polling register 280, so that the communications handler routine 268 will be invoked by the polling routine 260.

Block 476 then directs the processing circuit to read the timer bit in bit position 352 in the polling register 280 to determine whether this bit is set. If it is set, block 478 directs the processing circuit to call the valve control routine shown in FIG. 13. This ensures that an update of the valves is not missed as a result of a communications interrupt. Upon completion of the valve control routine or if the timer bit is not set, the communications interrupt routine is ended.

Figure 15:
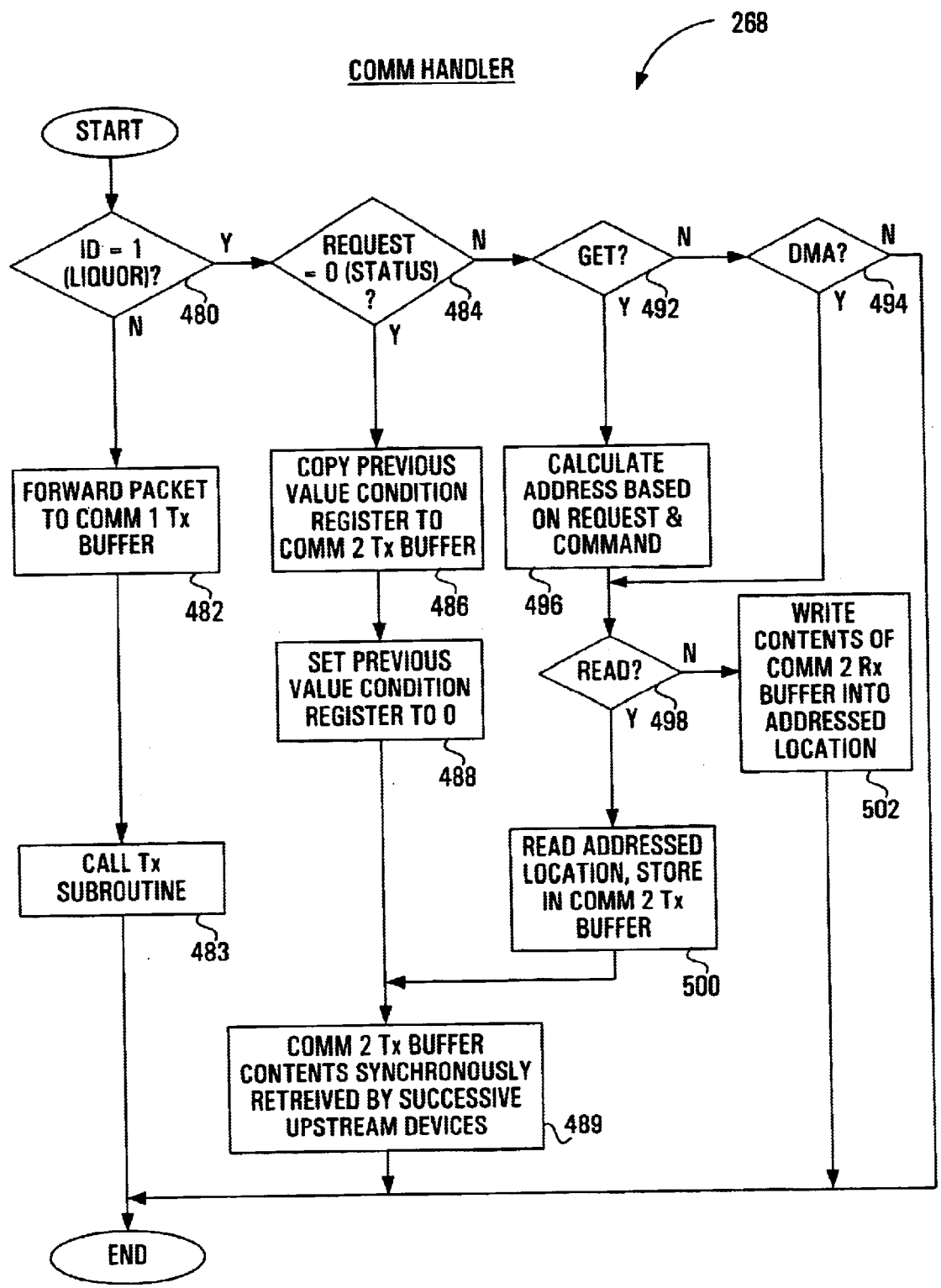
FIG. 15 is a communications handler routine run by the processing circuit of the liquor system controller.

Referring to FIG. 15, the communications handler routine is shown generally at 268.

The communications handler routine is entered from the valve control routine 265 shown in FIG. 13, or from the polling routine 260 shown in FIG. 9. Before the communications handler routine is run, the processing circuit has received in the COMM 2 packet receive buffer 330, a four byte packet as shown at 130 in FIG. 6. The communications handler routine directs the processing circuit 220 to determine whether an incoming message is addressed to the liquor system controller. If the incoming message is a status request addressed to the liquor system controller, the processing circuit is directed to effectively transmit the contents of the previous valve condition register to the variance controller, to indicate which liquor valves have been actuated since the previous status request. If the incoming message is a request for an amount of liquor dispensed through one of the liquor dispensing valves, the processing circuit is directed to effectively transmit to the variance controller the contents of the total value in ounces register 416 and the brand number field 415 of the appropriate pour subtable 406. If the incoming message is not addressed to the liquor system controller, the processing circuit is directed to forward the message downstream over the network 39 via the first communications port 228.

The communications handler begins with a first block 480 which directs the processing circuit to read the identifier byte 134 shown in FIG. 6 to determine whether the identifier corresponds to that of the liquor system controller. If the identifier is not that of the liquor system controller, block 482 directs the processing circuit to copy the entire four byte packet from the COMM 2 packet receive buffer 330 into the COMM 1 packet transmit buffer 328 corresponding to the first communications port 228. A conventional transmit subroutine 269 of the communications handler routine 268 is then called and executed at block 483 to forward the four byte packet over the communications network 39 in the downstream direction, according to the communications protocol shown in FIG. 6. In this embodiment, the packet is transmitted downstream to the beer metering system 60. The communications handler is then ended.

If at block 480, the identifier corresponds to that of the liquor system controller, block 484 directs the processing circuit to read the request byte 132 to determine whether it corresponds to a status request. If it does correspond to a status request, block 486 directs the processing circuit to copy the contents of the previous valve condition register 324 to the COMM 2 packet transmit buffer 332. Block 488 then directs the processing circuit to set the contents of the previous valve condition register 324 to zero.

As illustrated in block 489, the contents of the COMM 2 packet transmit buffer 332 are then synchronously retrieved by successive upstream devices, in response to successive clock pulses on the network 39, in the same manner as discussed previously in the context of block 157 in FIG. 7. In this embodiment, the next upstream device is the variance controller 48, and thus the contents of the COMM 2 packet transmit buffer are subsequently synchronously retrieved by the variance controller. The communications handler is then ended.

If at block 484, the request byte 132 does not correspond to a status request, the processing circuit is directed to blocks 492 through 502 which effect generally the same functionality as blocks 162 through 172 shown in FIG. 7. In other words, in response to a calculated address or an address included within the data packet, the processing circuit is directed to read from or write to the addressed locations, and to copy the contents of the addressed location into the COMM 2 packet transmit buffer 332 or to modify the location so addressed. In the case of a read command, once the contents of the addressed location have been stored in the COMM 2 packet transmit buffer 332 at block 500, the contents of the COMM 2 packet transmit buffer 332 are once again synchronously retrieved by successive upstream devices, i.e., by the variance controller 48. For example, the request byte may correspond to a particular liquor key, and the processing circuit 220 may respond at block 500 by reading the total value in ounces register 416 and brand number field 415 corresponding to the particular key and copying the data so read to the COMM 2 packet transmit buffer 332 for subsequent synchronous retrieval by the variance controller. Upon completion of such reading or writing, the communications handler routine 268 is completed.

Variance Controller

Figure 16:
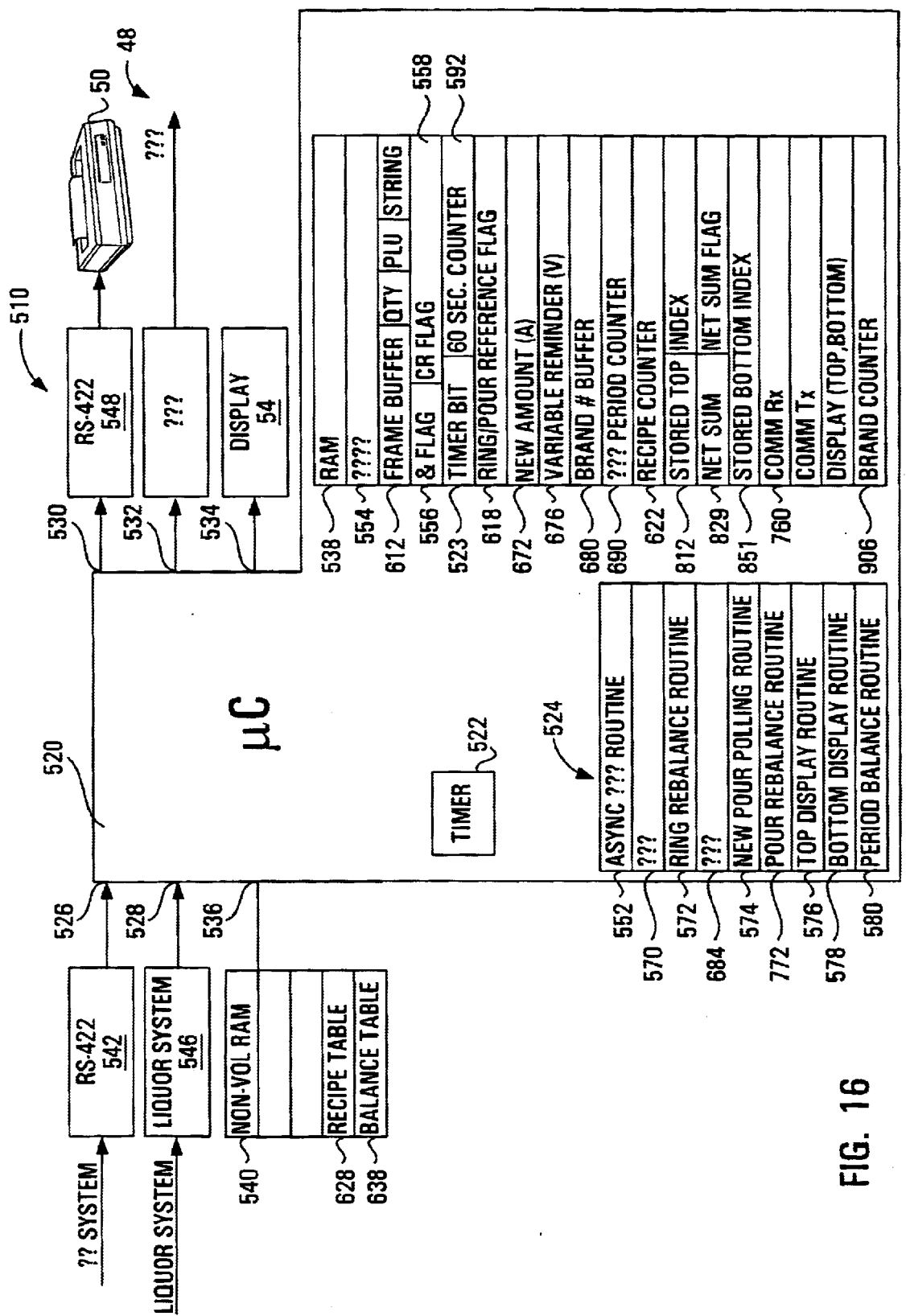
FIG. 16 is a block diagram of a variance controller shown in FIG. 1.

Referring to FIG. 16, the variance controller is shown generally at 48. The variance controller includes a processing circuit shown generally at 510. The processing circuit 510 includes a microcontroller 520. The microcontroller has integral volatile random access memory (RAM) 538, a built-in timer 522 and built-in EPROM 524. Once per second, the timer 522 sets active a bit stored in a timer bit register 523. The microcontroller further includes first, second, third and fourth communications ports 526, 528, 530 and 532. The microcontroller is further equipped with an I/O port 534 and has a data line shown generally at 536 for connecting to non-volatile battery-backed RAM 540.

The first communications port 526 is connected to an RS-422 communications interface 542 for receiving signals from the point of sale (POS) system 32 on conduit 40 shown in FIG. 1.

The second communications port 528 is connected to a liquor system communications interface 546 in order to transmit and receive signals on conduit 41 from the metered liquor dispensing system and the draft beer dispensers.

The third communications port 530 is connected to an RS-422 interface 548 which is further connected to the bar printer 50.

The fourth communications port 532 is connected to an RS-485 interface 550 to enable communications with the remote printer 52 shown in FIG. 1 over the network.

The I/O port 534 is connected to the display 54 shown in FIG. 1 and thus the processing circuit 510 is operable to control the display.

The EPROM 524 includes blocks of codes for directing the processing circuit 510 to execute a plurality of routines or processes.

Figure 17:
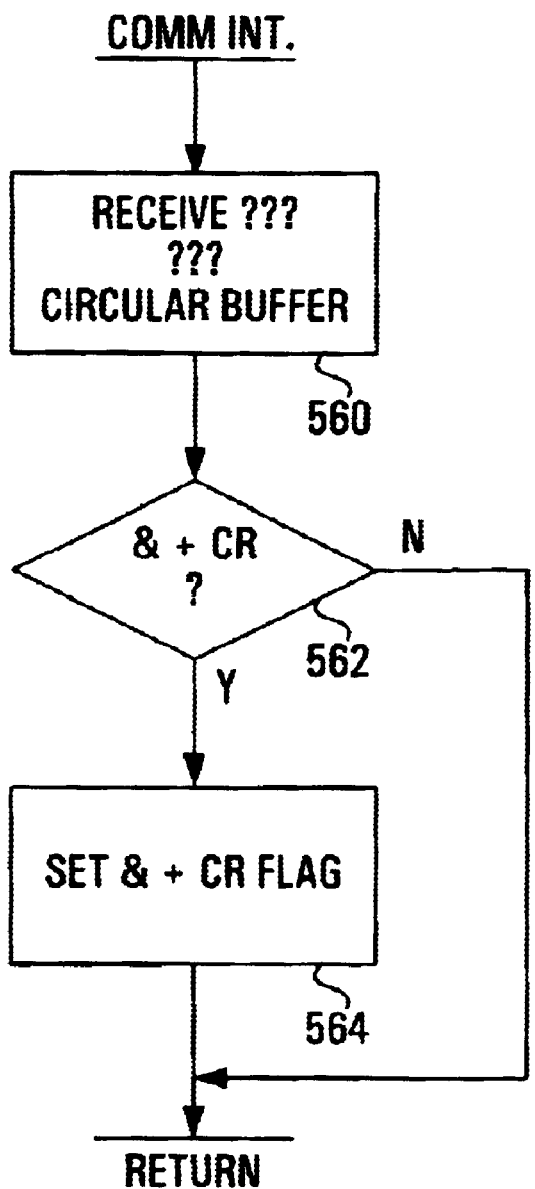
FIG. 17 is a block diagram of an asynchronous point of sale routine run by a processing circuit of the variance controller.

Referring to FIGS. 16 and 17, one of such routines includes an asynchronous point of sale message receiving routine 552 which defines a circular buffer 554 and flag registers 556 and 558 in the RAM 538. The asynchronous point of sale message receiving routine directs the processing circuit 510 to receive data from the point of sale (POS) system 32 shown in FIG. 1, to store the received data in the circular buffer 554, and to set flags in the flag registers 556 and 558 to indicate that a complete "ring" or request indication has been received from the point of sale (POS) system.

The asynchronous point of sale message receiving routine 552 is initiated upon receiving an interrupt at the first communications port 526 in response to receipt of data from the point of sale system 32, i.e. from one of the cash registers 34, 36 and 38 in FIG. 1. Referring back to FIGS. 16 and 17, the asynchronous point of sale message receiving routine further includes a block 560 which directs the processing circuit 510 to store bytes received at the first communications port 526 in the circular buffer 554. It will be appreciated that the asynchronous point of sale message receiving routine includes the necessary pointers and control codes to direct the processing circuit to implement the circular buffer 554 in accordance with conventional methods. Thus, indications of sales of beverages, or more particularly request indications representing a request for a beverage, are received in the circular buffer.

Block 562 then directs the processing circuit to determine whether the contents of the circular buffer 554 include representations of pre-defined characters which, in this embodiment, include the ASCII ampersand and the ASCII carriage return. If both of such characters are not found in the circular buffer, the asynchronous point of sale message receiving routine 552 is ended and the processing circuit returns to whatever routine it was previously running. If on the other hand at block 562 the processing circuit has located both the pre-defined characters in the circular buffer 554, block 564 directs the processing circuit to set active the contents of the flag registers 556 and 558. This provides a signal that the circular buffer contains a message at a location defined by the pre-defined characters, which represents a sale of a beverage, or more generally, a request indication for a beverage.

Figure 18:
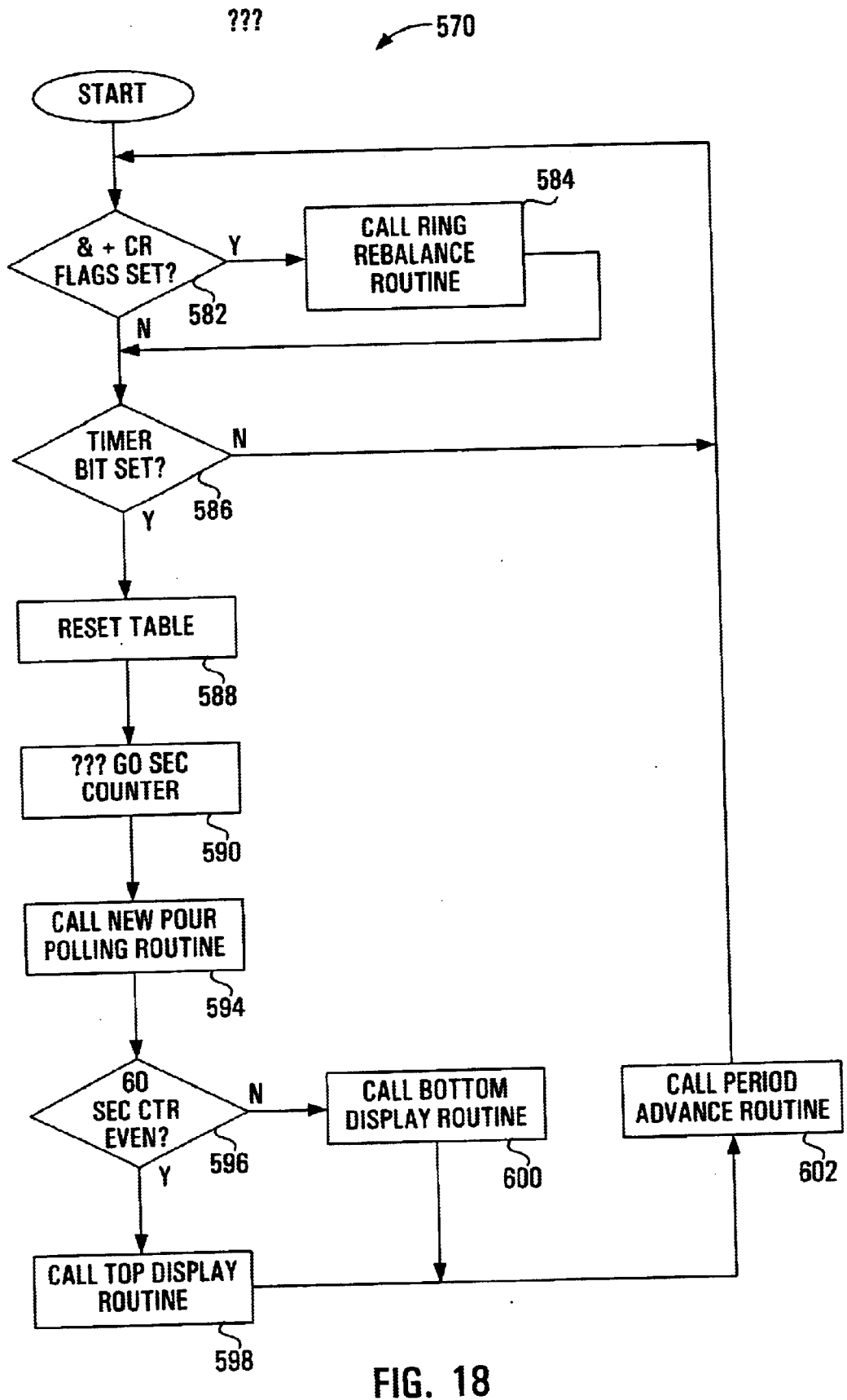
FIG. 18 is a data acquisition routine run by the processing circuit of the variance controller.

Referring to FIGS. 16 and 18, the EPROM 524 further includes a data acquisition routine 570. The data acquisition routine has a flow which is controlled in response to the contents of the flag registers 556 and 558 and the contents of the timer bit register 523. The data acquisition routine directs the processing circuit 510 to call a ring rebalance routine 572 whenever a complete "ring" or request indication is received from the POS system 32, and to call a new pour polling routine 574 once every second, to determine whether any new amounts of beer or liquor have been dispensed or provided from the draft beer dispensers or metered liquor dispenser. The data acquisition routine further directs the processing circuit to call, in alternating seconds, a top display routine 576 and a bottom display routine 578 for controlling an image which appears on the display 54 of the variance controller.

The data acquisition routine 570 also calls a period advance routine 580 which serves to define time intervals during which requested (billed) and provided (poured) beverages are balanced.

Still referring to FIGS. 16 and 18, the data acquisition routine begins with a first block 582 which directs the processing circuit to determine whether the contents of the flag registers 556 or 558 are both set. If so, then block 584 directs the processing circuit to call the ring rebalance routine 572. If the flags are not set, block 586 directs the processing circuit to read the contents of the timer bit register 523 to determine whether the timer bit is set. If this bit is not set, the processing circuit is directed back to block 582 where it continues with the functions of that block as described above. If at block 586 the timer bit is set, block 588 directs the processing circuit to reset the timer bit to zero, and block 590 directs the controller to decrement the contents of a 60 second counter register 592.

Block 594 then directs the processing circuit to call the new pour polling routine 574, after which, block 596 directs the processing circuit to determine whether the contents of the 60 second counter register 592 are an even or odd number. If such contents are even, then block 598 directs the processing circuit to call the top display routine 576 and if the contents of the 60 second counter register 592 are odd, block 600 directs the processing circuit to call the bottom display routine 578. Thus, the top and bottom portions of the display are updated in alternate seconds of time.

After completion of either the top or bottom display routines 598 or 600, the data block 602 directs the processing circuit to call the period advance routine 580 after which the processing circuit is directed back to block 582 to function as described above.

Figure 19:
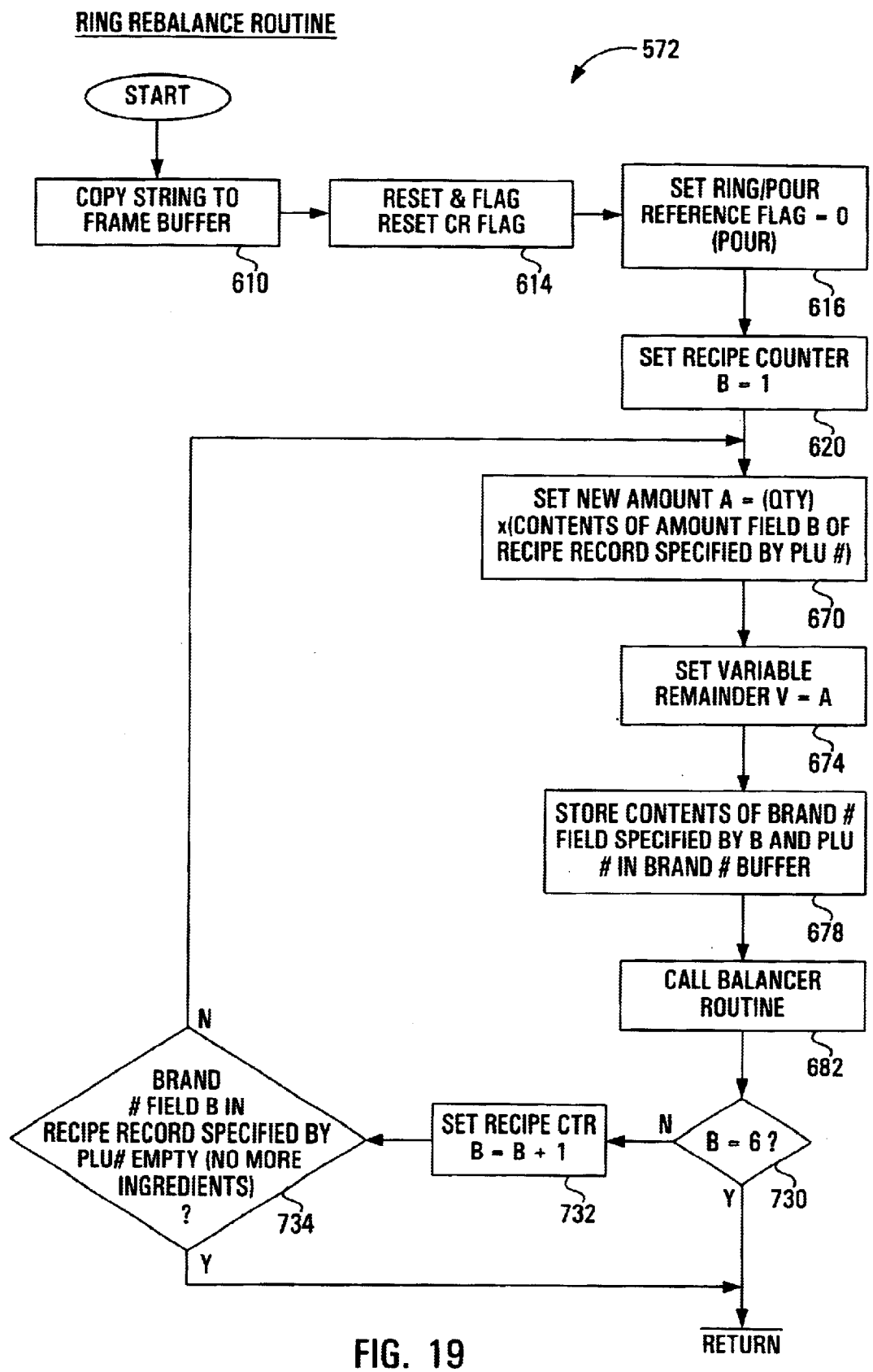
FIG. 19 is a flow chart of a ring rebalance routine run by the processing circuit of the variance controller.

As described above, during the data acquisition routine 570, block 584 directs the processing circuit to call the ring rebalance routine 572 shown in FIG. 19. The ring rebalance routine directs the processing circuit to determine a requested amount of each ingredient in the beverage described in the request indication received from the POS system 32, and for each requested ingredient, to call a balancer routine 684 to attempt to locate a corresponding provided amount.

Referring to FIGS. 16 and 19, the ring rebalance routine 572 begins with a first block 610 which directs the processing circuit to copy a price look-up or PLU number and a quantity from the circular buffer 554, the location of the data being defined by the pre-defined characters, in this case the ampersand and the carriage return. The PLU number represents a type of beverage dispensed, such as a Long Island Iced Tea for example, and the quantity indicates the number of such beverages dispensed, such as two, for example. The PLU number and quantity values are copied to a frame buffer 612. Block 614 then directs the processing circuit to reset the contents of the flag registers 556 and 558. Block 616 then directs the processing circuit to set the contents of a ring/pour reference flag register 618 to zero to indicate that records of previous pours should be reviewed when the balancer routine is subsequently called.

Block 620 then directs the processing circuit to set the contents of a recipe counter register 622 to an initial value, in this case, one.

Referring to FIGS. 16 and 20, the contents of the recipe counter register 622 identify one of six ingredient fields, one of which is shown at 624, of a recipe record 626 in a recipe table 628 stored in the non-volatile RAM 540. Each price look-up or PLU number in the POS system, when converted to binary, is equal to the base address in the non-volatile RAM 540 of the recipe record corresponding to the PLU number, and thus, a recipe record corresponds to each type of beverage dispensed. The recipe table further includes a count field 632.

Each ingredient field of the recipe record is further subdivided into a brand number field 634 and an amount field 636. The ingredient fields, specifically the brand number fields 634, identify the brands of liquor used in making the beverage, or in other words, identify the items required to fulfill the request indication received from the cash register. Thus, when information relating to a new requested amount is received, it is possible to determine which items in the recipe table the new requested amount relates to. The amount fields 636 identify the amount of corresponding brands used in the recipe. The count field 632 is used to keep track of how many requests for such beverage are received at the cash registers, collectively.

The non-volatile RAM 540 is further configured to include a balance table 638. Referring to FIG. 21, the balance table 638 is used to hold a plurality of brand records, one of which is shown at 640. The base address in non-volatile RAM 540 of the brand record for a given brand of beer is equal to the contents of the corresponding brand number field 107 shown in FIG. 5, and similarly, the base address in non-volatile RAM 540 of the brand record for a given brand of liquor is equal to the contents of the corresponding brand number field 415 shown in FIG. 12. Likewise, referring back to the recipe table 628 shown in FIG. 20, each of the brand number fields 634 contains the base address in non-volatile RAM 540 of the corresponding laze brand record in the balance table 638.

Each brand record includes a brand name field 644, a billed total field 646, a dispensed total field 648, a top display flag field 650, a bottom display flag field 652 and ten timeout period fields numbered zero to nine, the ninth timeout period field being shown at 654 and the zeroth timeout period field being shown at 656. Each timeout period field includes a ring/pour flag 658 and a net value field 660. Each brand record further includes a new accumulated total field 766 and a previous accumulated total field 764.

The brand name field 644 holds a string indicating the name of the corresponding liquor. The billed total field 646 holds a number representing the total amount of the liquor which has been billed through the cash registers, excluding any recent amounts still stored in the ten timeout period fields. The dispensed total field 648 holds a number representing the total amount of that particular brand dispensed, excluding any recent amounts still stored in the ten timeout period fields. The top display flag field 650 holds a flag to indicate whether the record should be considered for display on the top of the display 54 shown in FIG. 1 and the bottom display flag has a similar effect for the bottom portion of the display 54. The ring/pour flag 658 indicates whether the contents of the net value field 660 represent a ring (i.e. a billed or requested amount) or a pour (i.e. a dispensed or provided amount). The timeout periods are used to hold ring or pour balances which have not been reconciled during the corresponding period but which may be reconciled subsequently. More generally, the timeout period fields hold values representing previous requested amounts or previous provided amounts of a particular brand or item. In other words, the timeout period fields store representations of requests for or provisions of amounts of an item in corresponding time periods.

Referring back to FIGS. 16 and 19, block 670 directs the processing circuit to convert the PLU number stored in the frame buffer into a binary number and use the binary number to address a corresponding recipe record in the recipe table shown in FIG. 20. The processing circuit is directed to load a new amount register 672 with a value calculated as the product of a provided quantity of a beverage determined from the data stored in the frame buffer and the contents of the amount field 636 corresponding to an ingredient identified by the brand number field 634 shown in FIG. 20 of the addressed recipe record. Thus, effectively, the contents of the new amount register represent a new requested amount of a particular item and thus the contents act as a request indication representing a request for an item. In this embodiment, the item is an ounce of vodka, for example.

Block 674 then directs the processing circuit to set the contents of a variable remainder register 676 equal to the contents of the new amount register 672 for use in future calculations.

Block 678 then directs the processing circuit to store in a brand number register 680 the contents of the brand number field 634 shown in FIG. 20 specified by the contents of the recipe counter and the PLU number.

Figure 22:
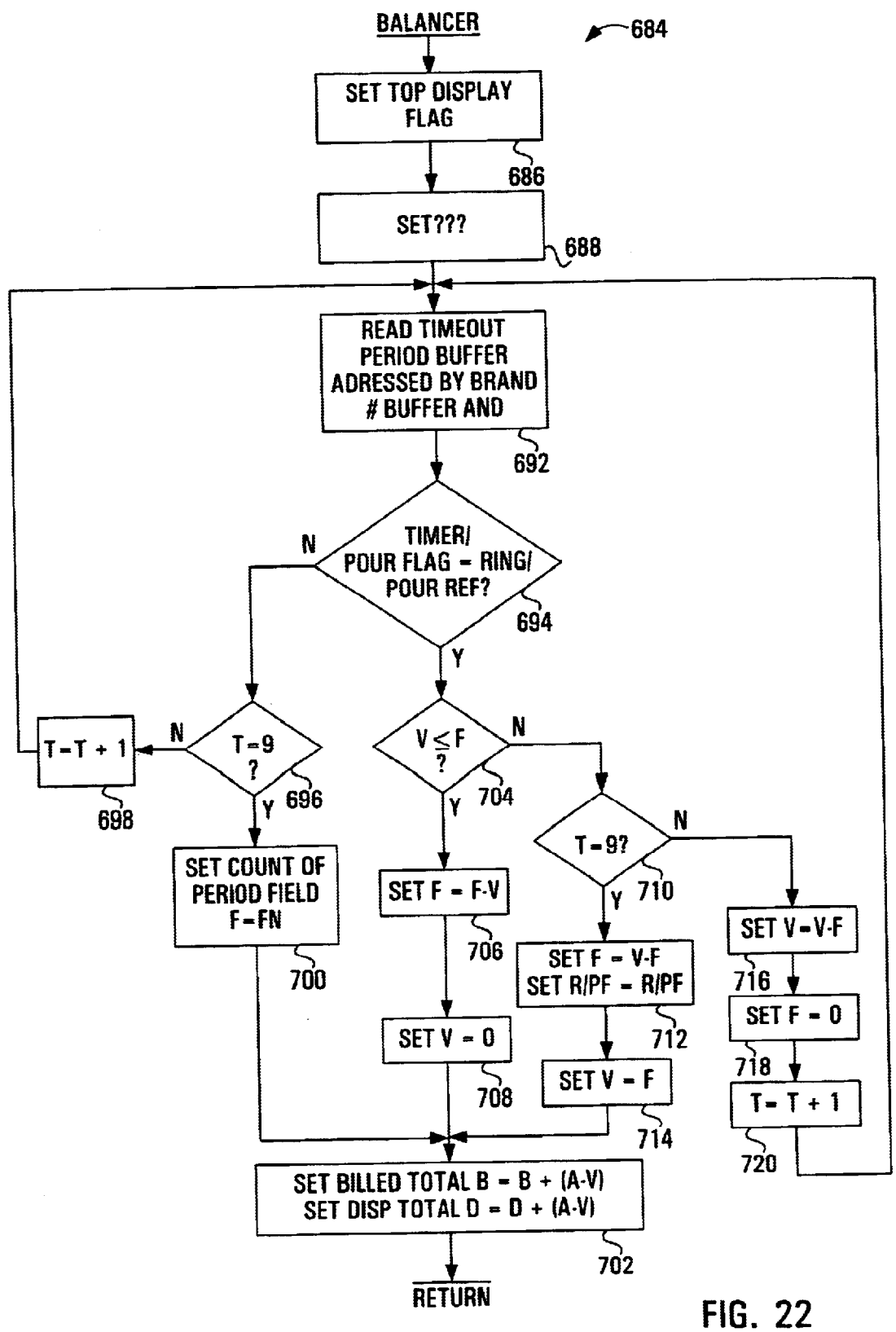
FIG. 22 is a flow chart of a balancer routine run by the processing circuit of the variance controller.

Block 682 then directs the processing circuit to call the balancer routine 684, shown in FIG. 22. When a new "ring" representing a billed or requested amount of a particular brand of beer or liquor is received, the balancer routine directs the processing circuit 510 to search the timeout period fields corresponding to the requested brand, for a corresponding unbalanced previous "pour" or provided amount. The searching begins with the oldest timeout period field 656 shown in FIG. 21, and is proceeds through successively more recent time periods. Whenever a pour is found, the new ring is used to reduce the pour to zero, if possible. If any remainder of the new ring exists after reducing the previous pour to zero, the remainder is carried forward to be used to reduce any more recent pours. If a ring remainder still exists when the newest timeout period field is addressed, the contents of the newest timeout period are rebalanced to incorporate the uncanceled portion or remainder of the ring. In other words, in response to a call from the ring rebalance routine, the balancer routine cancels the previous provided amounts associated with successively later time periods while reducing the new requested amount by each cancelled previous provided amount and adds any non-cancelled new requested amount to the previous requested amount associated with a latest time period. Any portion of the new ring which was used to cancel a previously stored pour is added to both the billed total and the dispensed total, so that they are updated to include the cancelled or balanced rings and pours. A converse process occurs when new "pour" information is received, as will be discussed later in the context of the pour rebalance routine.

Referring to FIG. 22, the balancer routine includes a first block 686 which directs the processing circuit to set active the contents of the top display flag field 650 in FIG. 21 of the brand record specified by the contents of the brand number register. Block 688 then directs the processing circuit to set the contents of a timeout period counter register 690 to zero in order to cause the processing circuit to address the oldest timeout period field 656 shown in FIG. 21. Block 692 then directs the processing circuit to read the contents of the net value field of the timeout period field addressed by the brand number register and the contents of the timeout period counter, and block 694 directs the processing circuit to read the ring/pour flag 658 to determine whether the flag is equal to the contents of the ring/pour reference flag register 618 previously set by the ring rebalance routine shown in FIG. 19.

Referring back to FIG. 22, if the ring/pour flag is not equal to the contents of the ring/pour reference flag register, block 696 directs the processing circuit to read the contents of the timeout period counter register 690 to determine whether the processing circuit is addressing the newest (ninth) timeout period field 654. If it is not addressing such period, the contents of the timeout period counter register 690 are incremented at block 698 and the processing circuit is directed back to block 692 where it addresses the next more recent timeout period, in other words, timeout period one.

If at block 696, the processing circuit is addressing the ninth timeout period field 654, block 700 directs the processing circuit to set the contents of the net value field 660 of the ninth timeout period field 654 equal to the sum of the present contents of the ninth timeout period field and the contents of the variable remainder register 676. In other words, in the event that a request for the new beverage is entered at a cash register, the identification of such beverage will identify the brand of liquor to be used in the beverage, through the recipe table. If no corresponding pour of the included brand has been made, or if corresponding pours exist but are less than the amount of the request, block 700 increases the contents of the net value field 660 of the newest timeout period field 654, thereby increasing the unbalanced requested amount.

Block 702 then directs the processing circuit to set the contents of the billed total field 646 equal to the current value of the billed total field plus the contents of the new amount register 672 less the contents of the variable reminder register 676. It will be appreciated in the instance just described above, where the contents of the new amount register 672 are equal to the contents of the variable remainder register 676, that the net effect is that the contents of the billed total field 646 are left unchanged. Effectively, the contents of the billed total field 646 represent a requested total of each of the cancelled previous requested amounts and previous requested amounts which have not been cancelled within a pre-defined period of time.

A similar procedure occurs with respect to the contents of the dispensed total field 648, as shown in block 702 of FIG. 22, such that effectively, the contents of the dispensed total field 648 represent a provided total of each of the cancelled previous provided amounts and previous provided amounts which have not been cancelled within a pre-defined period of time. The balancer routine is then completed.

Alternatively, if at block 694 the ring/pour flag 658 in FIG. 21 is equal to the contents of the ring/pour reference flag register 618, block 704 directs the processing circuit to determine whether the contents of the variable remainder register 676 are less than or equal to the contents of the addressed net value field. If the contents are less than or equal, block 706 directs the processing circuit to subtract the contents of the variable remainder register 676 from the contents of the net value field and block 708 directs the processing circuit to set the contents of the variable remainder register 676 equal to zero. Block 702 then updates the billed total field 646 and dispensed total field 648 according to the sum of the current contents plus the contents of the new amount register 672 less the contents of the variable remainder register 676. The net effect is that the contents of the new amount register 672 are added to the current billed total value stored in the billed total field 646. A similar operation occurs in connection with the dispensed total field 648.

If at block 704, the contents of the variable remainder register 676 are not less than or equal to the contents of the addressed net value field, block 710 directs the processing circuit to determine whether it is addressing the newest timeout period field 654. If it is, then block 712 directs the processing circuit to set the contents of the net value field equal to the contents of the variable remainder register 676 less the current contents of the net value field and to set the ring/pour flag 658 to its complementary value to indicate that the contents have changed from a net pour value to a net ring value or vice versa.

Block 714 then directs the processing circuit to set the contents of the variable remainder register 676 equal to the updated contents of the net value field and block 702 increases the contents of the billed total field 646 and the contents of the dispensed total field 648 by an amount equal to the difference between the contents of the new amount register and the contents of the variable remainder register.

If at block 710 the processing circuit determines that the currently addressed timeout period is not the newest timeout period, block 716 directs the processing circuit to set the contents of the variable remainder register equal to the difference between the current contents of the variable remainder register and the contents of the currently addressed net value field. Block 718 then directs the processing circuit to set the contents of the net value field equal to zero. This has the effect of reducing the contents of the currently addressed field to zero and carrying the excess or remainder for use in comparison against values stored in the next newest net value field on a subsequent pass through the algorithm.

This subsequent pass is initiated at block 720 which increments the contents of the timeout period counter register 690 and directs the processing circuit back to block 692.

In effect, when a new "ring" is received for a given brand record, each timeout period, beginning with the oldest timeout period field 656, is addressed to determine whether the ring/pour flag 658 associated with the addressed net value field represents a net pour value. If none of the timeout periods has such a flag set, the contents of the new amount register 672 are added to the contents of the net value field 660 of the newest timeout period field 654. It will be recalled that this amount is equal to the product of the quantity of the beverage sold, as indicated by the data stored in the frame buffer 612, and the amount of the given brand contained in each such beverage, as indicated by the contents of the amount field 636.

If, on the other hand, only one of the timeout periods has a ring/pour flag equal to the ring/pour reference, and if the contents of the new amount register 672 are less than the contents of the presently addressed net value field, the contents of the field ate reduced by the contents of the new amount register, and the billed and dispensed total fields 646 and 648 are incremented by the contents of the new amount register 672.

If, on the other hand, when the first complementary ring/pour flag is located, the contents of the new amount register are not less than or equal to the contents of the currently addressed field, and the newest timeout period field 654 is not currently being addressed, the contents of the variable remainder register 676 are reduced by the contents of the net value field, thus carrying over the remainder for consideration in the next time period, and the net value field is reduced to zero.

If the contents of the variable remainder register 676 representing either the contents of the new amount register 672 or the amount carried over as a remainder from a previous pass through the routine are greater than the contents of the newest timeout period field 654, and the ring/pour flag 658 is equal to the contents of the ring/pour reference flag register 618, the contents of the variable remainder register 676 are reduced by the contents of the newest timeout period field and the result is stored in the newest timeout period field. In addition, the ring/pour flag 658 is complemented and the contents of the billed and dispensed total fields 646 and 648 are incremented by the difference between the contents of the new amount register 672 and the newly calculated value of the net value field, which is now equal to the updated contents of the variable remainder register 676.

Referring back to FIG. 19, after running the balancer routine at block 682, block 730 directs the processing circuit to determine whether the contents of the recipe counter register 622 are equal to the maximum number of ingredients in a recipe (in this example 6) and if so, the ring rebalance routine is ended. If not, the contents of the recipe counter register 622 are incremented to address the next ingredient in the recipe and block 734 directs the processing circuit to determine whether the contents of the brand number field of the currently addressed ingredient are equal to zero and if so, the ring rebalance routine is ended, since all ingredients of the requested beverage have been addressed. If not, the processing circuit is directed back to block 670 to deal with the amount value stored in the amount field of the next ingredient field as described above in connection with blocks 670, 674, 678 and 682.

Figure 23:
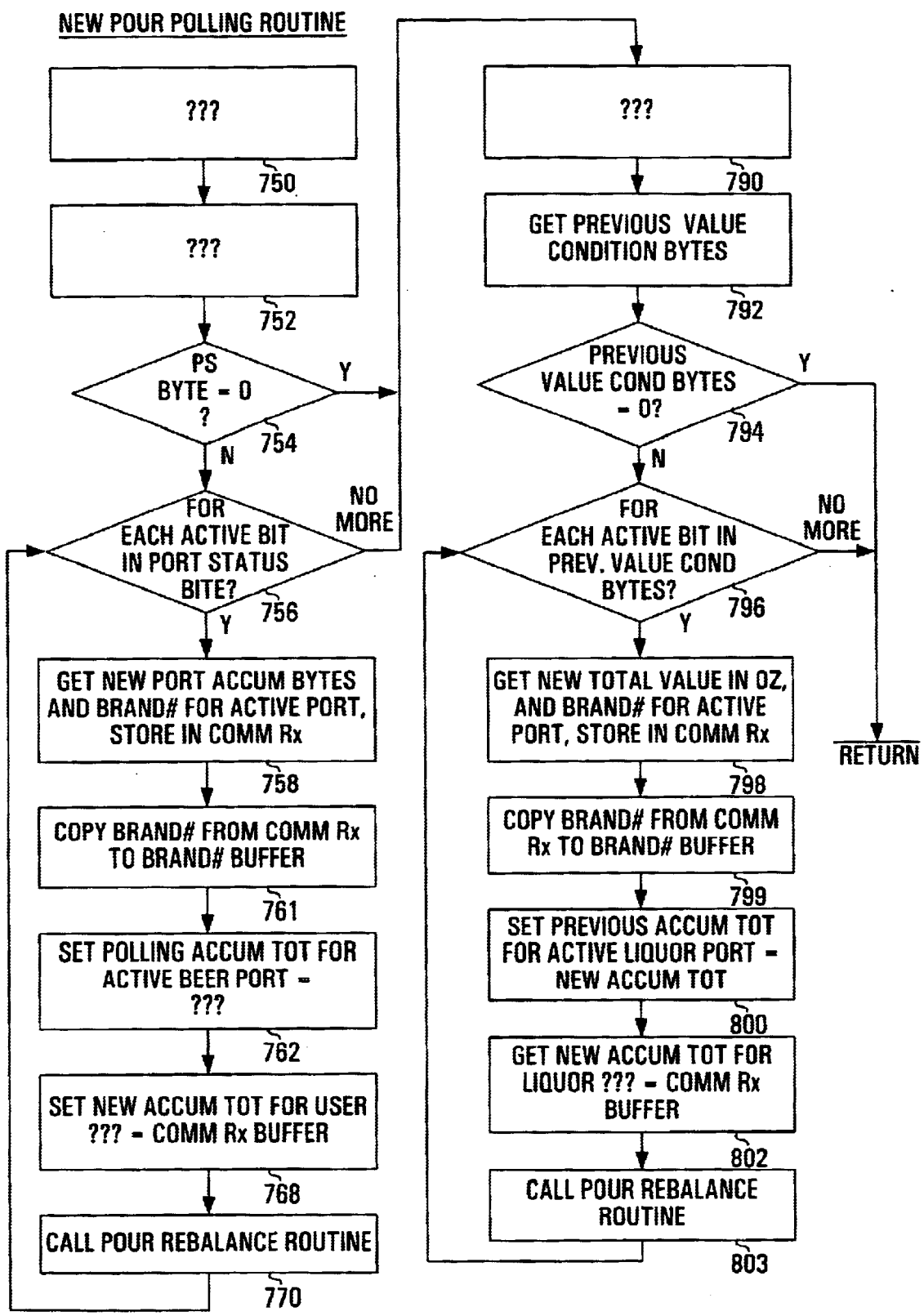
FIG. 23 is a flow chart of a new pour polling routine run by the processing circuit of the variance controller.

Referring to FIGS. 16 and 23, the new pour polling routine 574 was initiated at block 594 of the data acquisition routine 570 shown in FIG. 18. The new pour polling routine directs the processing circuit 510 to query both the beer metering system 60 and the liquor system controller 212 to determine which brands of beer and liquor have been dispensed or provided since the last such query. For each brand of beer or liquor which has been so provided, the processing circuit retrieves the new accumulated total amount (i.e. the new total amount provided) of the brand, and calls the pour rebalance routine to attempt to balance the new "pour" or provided amount against corresponding unbalanced "rings" or requested amounts.

Referring to FIGS. 16 and 23, the new pour polling routine 574 begins with a first block 750 which directs the processing circuit to send downstream a four byte data packet as shown in FIG. 6 with an ID byte whose contents identify the beer metering system 60, and a request byte equal to zero to indicate a status request, to the draft beer dispensers 42 shown in FIG. 1. It will be recalled that the beer metering system, in response to such a status request, will copy a meter status byte stored in the meter status register 110 shown in FIG. 5 to its communications transmit buffer 113.

Referring back to FIGS. 16 and 23, at block 752, the processing circuit 510 then retrieves the meter status byte, now stored in the communications transmit buffer 113, from the beer metering system, via the synchronous retrieval process described in the context of block 157 of FIG. 7.

Block 754 then directs the processing circuit to determine whether the meter status byte is zero. If it is not zero, block 756 directs the processing circuit to successively address each bit in the meter status byte to determine which bits are set active. On locating a bit which is set active, block 758 directs the processing circuit 510 to send another four byte data packet to direct the beer metering system to copy the contents of the meter accumulator register 104 and the contents of the brand number field 107 corresponding to the active bit, as shown in FIG. 5, to the communications transmit buffer 113, following which the contents of the communications transmit buffer 113 will be synchronously retrieved by the variance controller. The processing circuit 510 is directed to store the retrieved bytes in a communications receive buffer 760. Thus, the contents of the meter accumulator registers act as a new provided amount or provided indication representing the amount of beer provided to a customer from a fluid dispensing system.

Block 761 then directs the processing circuit to copy the contents of the brand number field 107 from the communications receive buffer 760 to the brand number register 680, so that the particular brand of beer can be identified and its brand record in the balance table 638 addressed. It will be recalled that the base address in non-volatile RAM 540 of the brand record for a given brand of beer is equal to the contents of the corresponding brand number field 107 shown in FIG. 5.

With meter accumulator bytes stored in the communications receive buffer 760, block 762 directs the processing circuit to address the previous accumulated total field 764 in the brand record of the balance table 638 corresponding to the contents of the brand number register 680, and set the contents of the previous accumulated total field 764 equal to the contents of the new accumulated total field 766.

Block 768 then directs the processing circuit to set the contents of the new accumulated total field 766 corresponding to the contents of the brand number register 680 equal to the meter accumulator bytes stored in the communications receive buffer 760.

Figure 24:
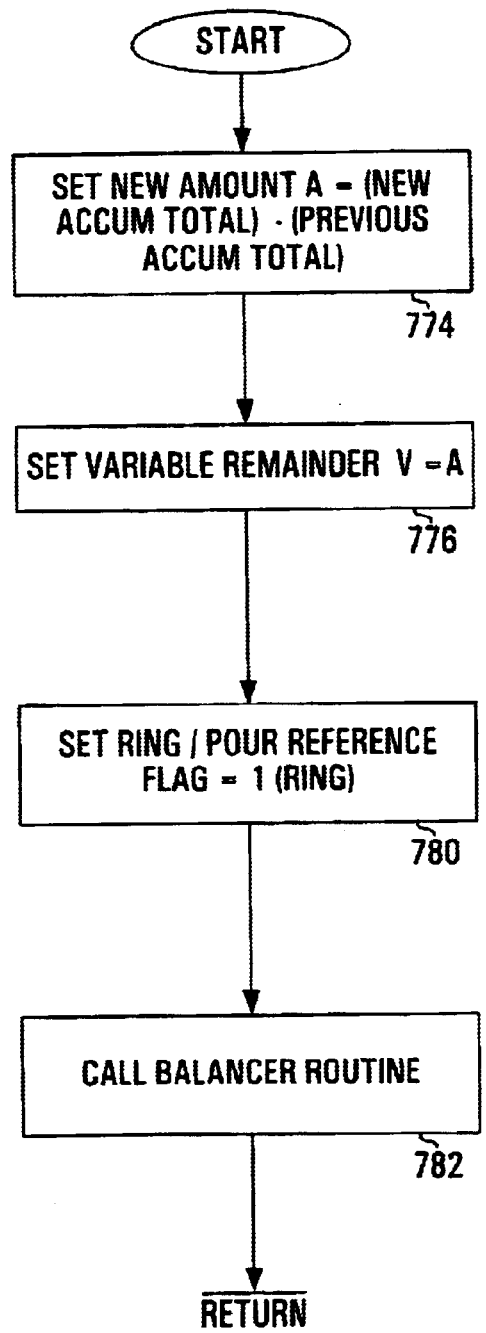
FIG. 24 is a flow chart of a pour rebalance routine run by the processing circuit of the variance controller.

Block 770 then directs the processing circuit to call a pour rebalance routine 772 shown in FIG. 24. The pour rebalance routine directs the processing circuit to determine a "new amount" representing the provided or dispensed amount of the particular brand, and to call the balancer routine 684 to attempt to locate a corresponding requested amount.

Referring to FIG. 24, the pour rebalance routine includes a first block 774 which directs the processing circuit to set the contents of the new amount register 672 equal to the difference between the contents of the new accumulated total field 766 and the previous accumulated total field 764 of the brand record addressed by the brand number register 680.

Block 776 then directs the processing circuit to set the contents of the variable remainder register 676 equal to the contents of the new amount register 672.

Block 780 then directs the processing circuit to set the contents of the ring/pour reference flag register 618 equal to one to represent a "ring", and block 782 directs the processing circuit to call the balancer routine 684 as shown in FIG. 22. When the balancer routine is called by the pour rebalance routine, it cancels the previous requested amounts associated with successively later time periods while reducing the new provided amount by each cancelled previous requested amount and adds any non-cancelled new provided amount to the previous provided amount associated with a latest time period.

The above blocks 758, 761, 762, 768 and 770 are repeated for each active bit in the meter status byte.

After each active bit in the meter status byte has been tested and there are no more bits, or if at block 754 the meter status byte is equal to zero, the processing circuit is directed to block 790 which directs it to transmit downstream another four byte data packet as shown in FIG. 6 with an ID byte identifying the liquor system controller and a request byte identifying a status request. Referring to FIGS. 8 and 15, it will be recalled from block 486 of FIG. 15 that the liquor system controller will respond to such a request by storing the contents of the previous valve condition register 324 shown in FIG. 8 to its COMM 2 packet transmit buffer 332.

Referring back to FIGS. 16 and 23, block 792 then directs the processing circuit to retrieve the contents of the previous valve condition register 324, now stored in the COMM 2 packet transmit buffer 332, via the synchronous retrieval process described in the context of block 489 of FIG. 15.

Block 794 then directs the processing circuit to determine whether the bytes representing the contents of the previous valve condition register are equal to zero, and if so, no change has occurred in the metered liquor dispensing system and the new pour polling routine 574 is ended. If however, at least one of the bits in the previous valve condition bytes is set active, block 796 directs the processing circuit, for each active bit in the previous valve condition bytes, to execute block 798 which directs the processing circuit to send a message to the liquor system controller instructing the latter to copy to its COMM 2 packet transmit buffer 332 the contents of the brand number field 415 and the total value in ounces register 416 from the pour subtable corresponding to the active port represented by the active bit in the previous valve condition bytes. The contents of the brand number field 415 and the total value in ounces register 416, now stored in the COMM 2 packet transmit buffer 332, are then synchronously retrieved by the variance controller. Thus, the processing circuit also receives from the liquor dispensing system a provided indication including a provided amount, in ounces, of at least one of the available liquors. Block 799 then directs the processing circuit to store the brand number from the brand number field 415 in the brand number register 680 shown in FIG. 16.

Block 800 then directs the processing circuit to set the contents of the previous accumulated total field 764 of the brand record addressed by the contents of the brand number register 680 equal to the contents of the new accumulated total field 766 of the same record.

Block 802 then directs the processing circuit to set the contents of the new accumulated total field 766 equal to the total value in ounces bytes stored in the communications receive buffer 760.

Block 804 then directs the processing circuit to call the pour rebalance routine shown at 772 in FIG. 24.

The above blocks 798, 799, 800, 802 and 804 are repeated for each active bit in the previous valve condition bytes. The new pour polling routine is then ended.

Referring back to. FIGS. 16 and 18, after completing the new pour polling routine at block 594, block 596 directs the processing circuit to read the contents of the 60 second counter register 592 to determine whether such contents are odd or even. If such contents are even, the processing circuit is directed to call the top display routine 576 shown in FIG. 25. The top display routine directs the processing circuit 510 to scan the timeout period fields of each brand record, and if it finds a brand record with an unbalanced ring or pour, a reminder will be displayed on the top two lines of the screen for the next two seconds until the top display routine is called again. Two seconds later, the top display routine resumes scanning the brand records where it left off, and if another brand record with an unbalanced ring or pour is found, a new reminder will be displayed. If another such brand record is not found, the processing circuit will again display a reminder for the previously-displayed brand record, unless that brand record has been balanced in the last two seconds. Thus, the sum of the non-cancelled previous provided amounts, or non-cancelled previous requested amounts, for at least one of the plurality of items, is calculated and displayed. Thus, the display is used to signal an operator when a request indication has no corresponding provided indication and when a provided indication has no corresponding request indication.

Figure 25:
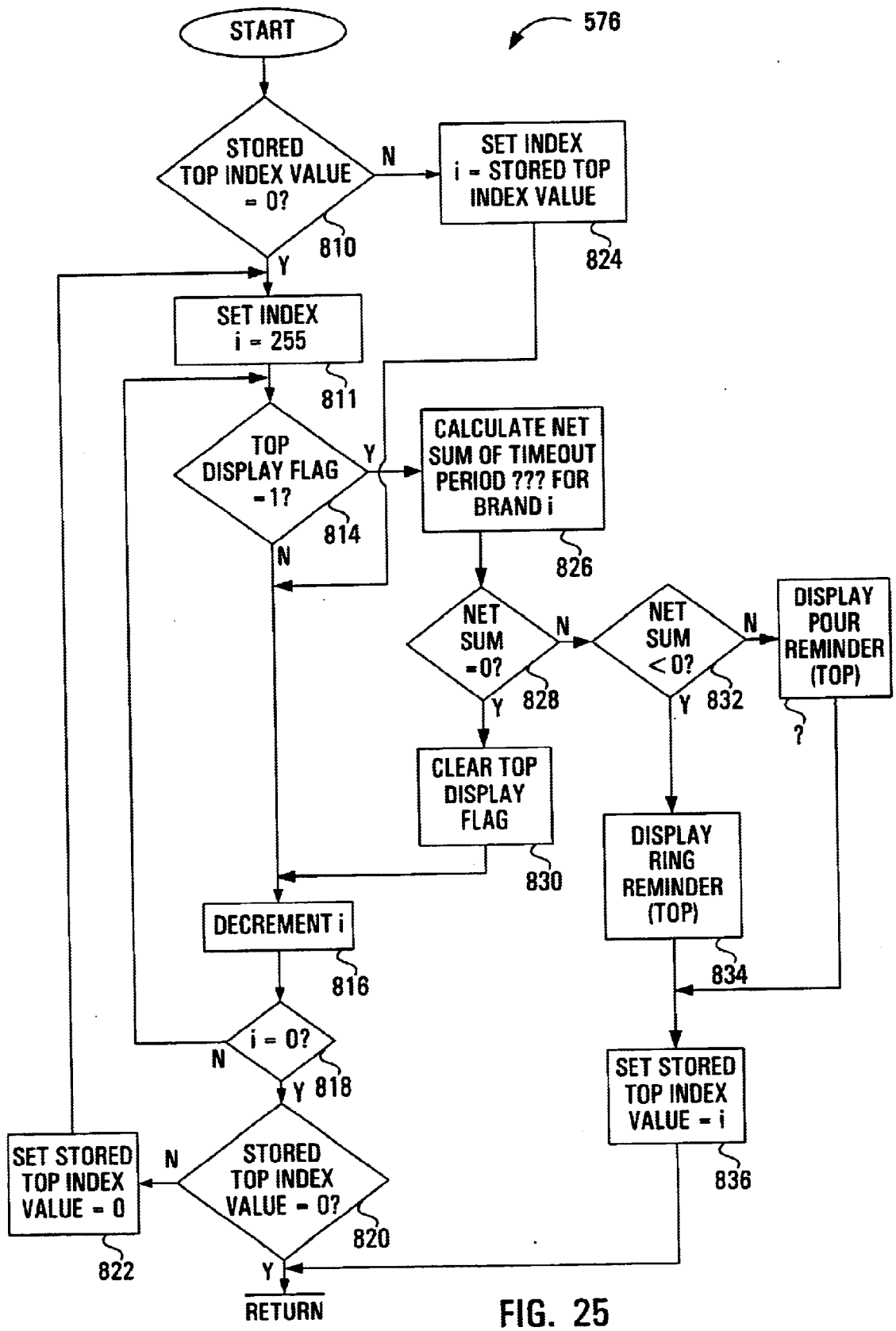
FIG. 25 is a flow chart of a top display routine run by the processing circuit of the variance controller.

Referring to FIGS. 16 and 25, the top display routine begins with block 810 which directs the processing circuit to read the contents of a stored top index register 812 to determine whether or not such contents are zero. This register is set later in the top display routine.

If the stored top index value is equal to zero, block 811 directs the processing circuit to set an index value I equal to 255. Block 814 then directs the processing circuit to determine whether or not the contents of the top display flag field 659 for the currently addressed brand record in the balance table 638 addressed by the index I are equal to one. If this flag is not set active, block 816 directs the processing circuit to decrement the index value and block 818 directs the processing circuit to determine whether the index value is equal to zero. If it is not equal to zero, the new index value after the decrement directs the processing circuit to the next brand record in the balance table where the top display flag of that record is tested at block 814.

If at block 818, the index is equal to zero, block 820 directs the processing circuit to determine whether the contents of the stored top index register 812 are equal to zero. If so, the top display routine is ended, since all brand records have been scanned at least once.

If at block 820 the top index value stored in the stored top index register 812 is not equal to zero, block 822 directs the processing circuit to set the contents of the stored top index register 812 equal to zero and the processing circuit is directed back to block 811.

If at block 810, the stored top index value is not equal to zero, block 824 directs the processing circuit to set the index value equal to the contents of the stored top index register 812 and the processing circuit is directed directly to block 816 where it decrements the index before returning to block 814 if the index is not equal to zero.

If at block 814, the top display flag register is tested and an active value is found, block 826 directs the processing circuit to calculate the net sum of the values stored in the ten timeout period fields of the brand record identified by the current index number. To calculate the net sum, block 826 directs the processing circuit to examine the ring/pour flag 658 and the net value field 660 associated with each timeout period field. It will be appreciated that the contents of the net value fields of the ten timeout period fields of any particular brand may be either all pours, or all rings, but never a combination of non-zero rings and non-zero pours. This is a consequence of the balancer routine 684, which allows a new ring, or more generally a new requested amount, to be stored in the newest timeout period field only if it is able to nullify all pours or previous provided amounts stored in earlier timeout fields, and which allows a new pour or new provided amount to be stored in the newest timeout period field only if it is able to nullify all rings or previous requested amounts stored in earlier timeout period fields. Thus, the net sum for each brand record is a simple sum of the contents of the net value fields of the ten timeout period fields, with a net sum flag equal to the ring/pour flag 658 corresponding to any non-zero net value field in the brand record. For simplicity, therefore, pours or provided amounts may be viewed as negative numbers and subtracted from the net sum, rings or requested amounts may be viewed as positive numbers and added to the net sum, and the ring/pour flag of the net sum may be viewed as an integer flag, to denote a negative number if set to zero, and a positive number if set to one. Block 826 further directs the processing circuit to store the net sum and the net sum flag in a net sum register 829.

Block 828 then directs the processing circuit to determine whether the net sum is equal to zero, and if it is, then block 830 directs the processing circuit to clear the contents of the top display flag field 650 of the addressed brand record and the processing circuit is directed back to block 816.

If, on the other hand, at block 828 the net sum is not equal to zero, block 832 directs the processing circuit to determine whether or not the net sum is less than zero. If the net sum is less than zero, unbalanced previous pours exist, and accordingly, block 834 directs the processing circuit to display a ring reminder message comprised of a fixed string indicating "Ring", the contents of the brand name field 644, the absolute value of the contents of the net sum register 829 and a fixed string indicating "Oz." on the top two lines of the display 54. Thus, there is calculated and displayed the sum of non-cancelled previous provided amounts. Block 836 then directs the processing circuit to set the contents of the stored top index register 812 equal to the current index value and the top display routine is ended.

If at block 832, the net sum is greater than zero, unbalanced previous rings exist, and accordingly, block 838 directs the processing circuit to display on the top two lines of the display 54, a pour reminder comprising a fixed string "Pour" followed by the contents of the brand name field 644 followed by the contents of the net sum register 829 and a fixed string "Oz.". Thus, there is calculated and displayed the sum of non-cancelled previous requested amounts. The processing circuit is then directed to block 836 as described above and the top display routine is ended.

Figure 26:
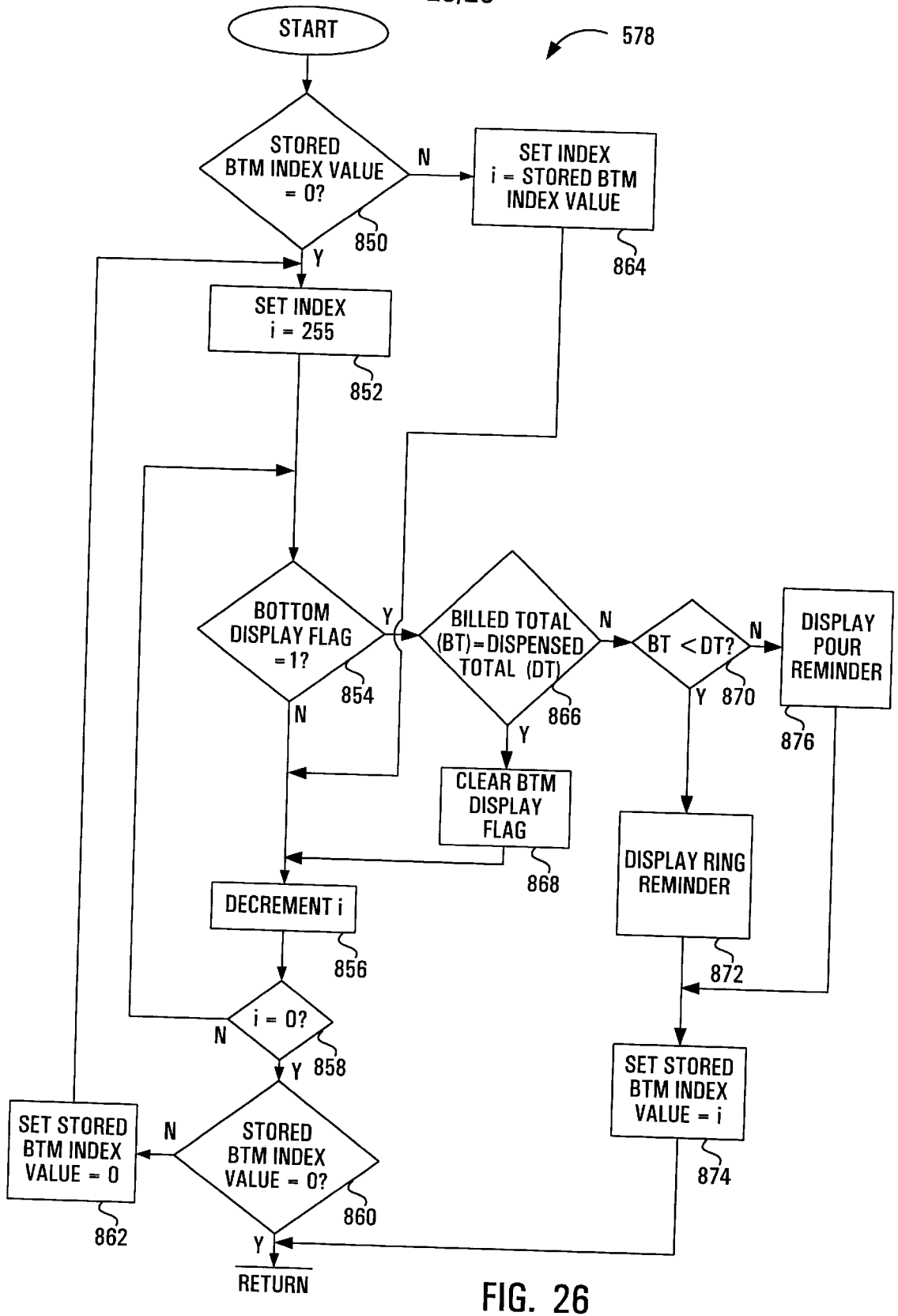
FIG. 26 is a flow chart of a bottom display routine run by the processing circuit of the variance controller.

Referring back to FIGS. 16 and 18, if at block 596, the 60 second counter register has odd contents, block 600 calls the bottom display routine shown generally at 578 in FIG. 26. The bottom display routine directs the processing circuit 510 to search for a brand record for which a billed total and dispensed total are not balanced. When such a brand record is located, a reminder is displayed at the bottom of the display for the next two seconds, at which point the processing circuit resumes searching where it left off. If another unbalanced brand record is located, a new reminder will then be displayed. However, if no other unbalanced brand record is located, the processing circuit will again display a reminder for the previously-displayed brand record, unless that brand record has been balanced in the last two seconds. Thus, for each item or brand there is calculated and displayed a difference between the provided total and the requested total.

The bottom display routine begins with a first block 850 which directs the processing circuit to read the contents of a stored bottom index register 851 to determine whether such contents are equal to zero. If so, block 852 directs the processing circuit to set an index counter to 255 and block 854 directs the processing circuit to determine whether the contents of the bottom display flag field 652 for the brand record specified by the current index counter value is active. If such contents are not active, then block 856 directs the processing circuit to decrement the index value and block 858 directs the processing circuit to determine whether the current index is equal to zero. If it is not equal to zero, the processing circuit is directed back to block 854.

If at block 858 the index is equal to zero, block 860 directs the processing circuit to determine whether the contents of the stored bottom index register 851 are equal to zero. If such contents are not equal to zero, block 862 directs the processing circuit to set the contents of that register equal to zero and the processing circuit is directed back to block 852.

If at block 850, the contents of the stored bottom index register are not equal to zero, block 864 directs the processing circuit to set the index equal to the value stored in the stored bottom index register 851 and the processing circuit is directed to block 856.

If at block 854 the bottom display flag of the brand record addressed by the index value contains active contents, then block 866 directs the processing circuit to determine whether the contents of the billed total field 646 are equal to the contents of the dispensed total field 648. If such contents are equal, then block 868 directs the processing circuit to clear the contents of the bottom display flag field 652 and the processing circuit is directed to block 856 where it decrements the index counter and tests the bottom display flag of the next record.

If at block 866, the contents of the billed total register are not equal to the contents of the dispensed total register, block 870 directs the processing circuit to determine whether the contents of the billed total field 646 are less than the contents of the dispensed total field 648. If so, block 872 directs the processing circuit to display a ring reminder on the bottom two lines of the display. Such reminder is of the form including a fixed string "Ring", followed by the contents of the brand name field 644, the difference between the contents of the dispensed total field 648, that is, the provided total, and the contents of the billed total field 646, that is, the requested total, and a fixed string "Oz.". Thus, the display displays the difference between the provided total and the requested total.

Block 874 then directs the processing circuit to store the current value of the index in the stored bottom index register 851 and the bottom display routine is ended. If at block 870 the contents of the billed total field 646 are greater than the contents of the dispensed total field 648, block 876 directs the processing circuit to display a pour or "provide" reminder on the bottom two lines of the display. The pour reminder has the form including a fixed string of the form "Pour", followed by the contents of the brand name field 644, the difference between the contents of the dispensed total field 648 and the contents of the billed total field 646, and a fixed string, "Oz.". The processing circuit is then directed to block 874 which functions as described above.

Figure 27:
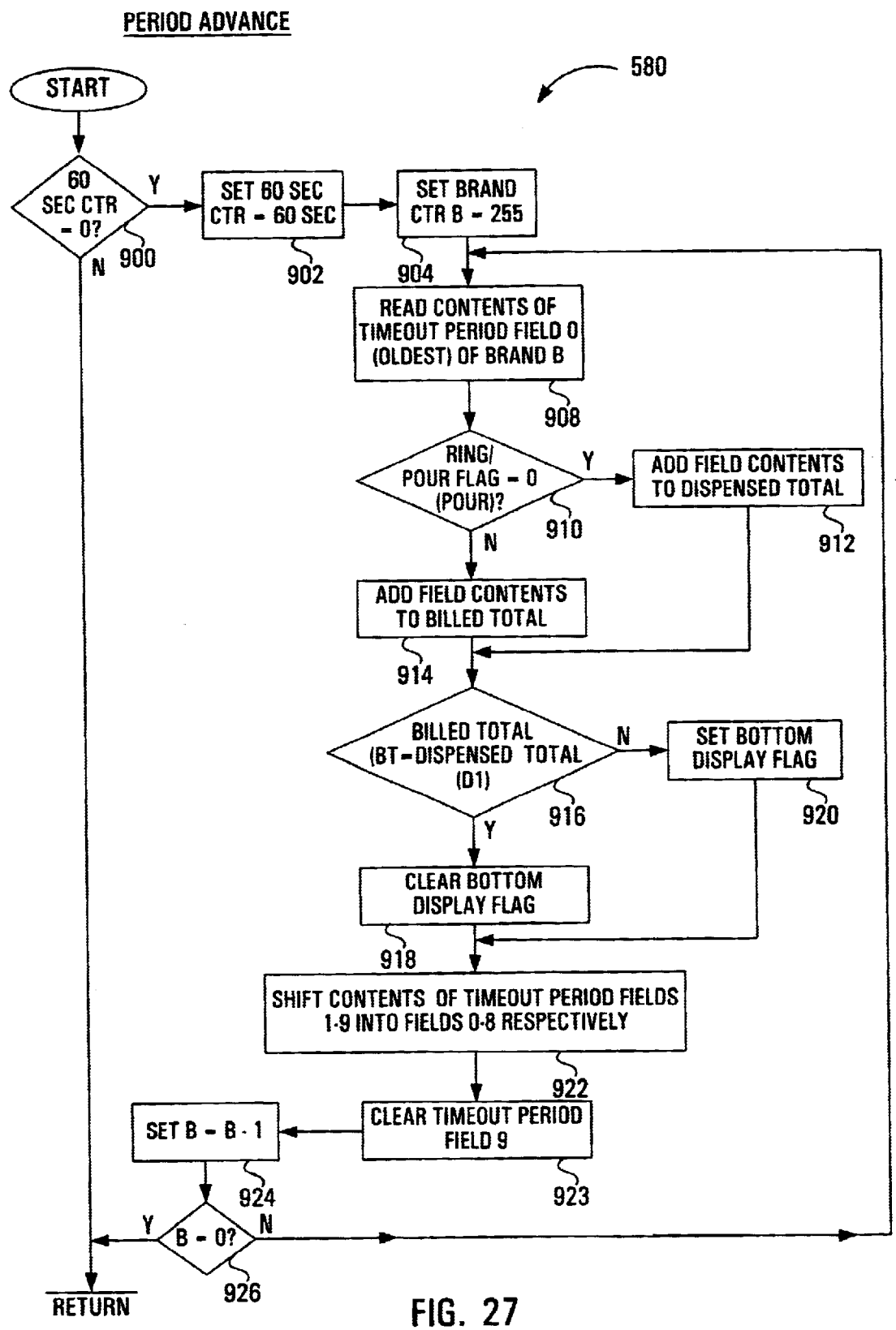
FIG. 27 is a flow chart of a period advance routine run by the processing circuit of the variance controller.

Referring back to FIG. 18, upon completion of either the top display routine or the bottom display routine at blocks 598 and 600, the processing circuit is directed to execute the period advance routine shown generally at 580 in FIG. 27. The period advance routine directs the processing circuit 510 to update the timeout period fields once per minute. Any unbalanced rings or pours which occurred in the oldest timeout period, in this embodiment 9 to 10 minutes previous, are added to the appropriate billed or dispensed total. If the billed total and dispensed total for a given brand are not balanced, a flag is set to indicate that the brand record should be examined by the bottom display routine. The contents of each remaining timeout period field are shifted into the next-oldest timeout period field, and the newest timeout period field is cleared, to be used during the next minute to store only new ring or pour amounts which fail to cancel complementary pour or ring amounts from older time periods.

The period advance routine begins with block 900 which directs the processing circuit to read the contents of the 60 second counter register 592 to determine whether such contents are equal to zero. If such contents are not equal to zero, the period advance routine is immediately ended. Otherwise, block 902 directs the processing circuit to set the contents of the 60 second counter register 592 equal to 60 and block 904 directs the processing circuit to set the contents of a brand counter register 906 equal to 255. Block 908 then directs the processing circuit to read the contents of the oldest timeout period field, i.e. period zero, of the brand record specified by the contents of the brand counter register 906.

Block 910 then directs the processing circuit to determine whether the ring/pour flag 658 of the addressed field indicates a pour. If it does, then block 912 directs the processing circuit to add the contents of the addressed field to the dispensed total held in the dispensed total field 648. If at block 910 the ring/pour flag indicates a ring, block 914 directs the processing circuit to add the contents of the currently addressed field to the contents of the billed total field 646.

After completion of blocks 912 or 914, block 916 directs the processing circuit to determine whether the contents of the billed total field 646 are equal to the contents of the dispensed total field 648. If such contents are equal, block 918 directs the processing circuit to clear the bottom display flag field 652 and if at block 916 the contents of the billed total field 646 are not equal to the contents of the dispensed total field 648, block 920 directs the processing circuit to set the contents of the bottom display flag field 652 active.

Block 922 then directs the processing circuit to shift the contents of timeout period fields one to nine into timeout period fields zero to eight respectively. Block 923 then directs the processing circuit to set the contents of timeout period field nine to zero.

Block 924 then directs the processing circuit to decrement the contents of the brand counter register 906 and block 926 directs the processing circuit to determine whether the contents of such register have been decremented to zero. If they have been decremented to zero then the period advance routine is ended. Otherwise, the processing circuit is directed back to block 908 where it functions as described above.

Alternatives

In an alternative embodiment of the invention, the variance controller advantageously incorporates the concept of a "tolerance". In the case of draft beer, an amount dispensed or provided by a bartender may not precisely equal the desired or requested amount. For example, the bartender might fill a 16 oz. glass with 15.7 oz. on one occasion, 16.2 oz. on another, and so on. On the other hand, referring back to FIGS. 16, 19 and 20, when a request for a 16 oz. glass of beer is entered at the point-of-sale system, the ring rebalance routine 572 at block 670 in FIG. 19 would set the contents of the new amount register 672 equal to precisely 16 oz., and the balancer routine would be called at block 682 to search for a corresponding pour of 16 oz. If at blocks 694 and 704 of FIG. 22, the processing circuit found an unbalanced previous pour of 16.2 oz., block 706 would direct the processing circuit to reduce the unbalanced pour to 0.2 ounces. Referring to FIG. 25, the top display routine at blocks 828 and 832 would yield a net sum of 0.2 oz with a net sum flag set to zero to denote a pour, and the processing circuit would be directed at block 834 to display a ring reminder to ring 0.2 oz. of the corresponding brand of beer. To avoid this unnecessary reminder, the concept of a "tolerance" is introduced.

Referring back to FIG. 21, each brand record 640 in the balance table 638 further includes a tolerance field 950. The contents of the tolerance field serve to define a range, such as ±0.5 oz, within which a pour will be "deemed" to equal a corresponding ring, or vice versa. In executing the balancer routine shown in FIG. 22, the processing circuit 510, immediately after finding a complementary flag at block 694, would be directed to determine whether the contents V of the variable remainder register 676 fell within a range defined by the contents F of the net value field 660 plus or minus the contents T of the tolerance field 950. If so, the contents F of the net value field 660 would be set equal to the contents V of the variable remainder register 676, and the processing circuit would be directed to block 706. If, on the other hand, the contents V of the variable remainder register did not fall within the range F±T, the processing circuit would be directed to block 704. In the above example, in which a 16.2 oz. pour was followed by a 16 oz. ring, for a brand whose brand record indicated a tolerance of ±0.5 oz., the 16.2 oz. pour would be deemed to equal 16 oz., the net value field and variable remainder field would be reduced to zero, and 16 oz. would be added to both the billed total and dispensed total.

In this embodiment, the tolerance values for brands of liquor dispensed through the metered liquor dispensing system may be set to zero, while the tolerance values for brands of beer, which are "free-poured" via the draft beer dispensers, may be set to any desired value, such as 0.5 ounces.

In a further embodiment of the invention, "ring" and "pour" reminders may also be printed on a printed chit 56 at the bar printer 50 shown in FIG. 1. For example, referring back to the period advance routine 580 shown in FIG. 27, the processing circuit may be further directed at blocks 912 and 914 to print a "pour" reminder or a "ring" reminder respectively, if the contents of the net value field 660 of the oldest timeout period field of the brand record addressed by the brand counter are not equal to zero. Thus, in this embodiment, in addition to the reminders displayed on the display 54, the bartender would be provided with a printed reminder of every unbalanced "ring" or "pour" as soon as it "times out", which, in the embodiments illustrated, would occur ten minutes after the beverage was either requested or provided.

Optionally, the processing circuit 510 may be further programmed to print out a daily printout or other "batch job" on the printer 52 shown in FIG. 1. For example, such a printout might include, for each brand record in the balance table, the contents of the brand name field, the billed total field, the dispensed total field, and a variance equal to the difference between the contents of the billed total field and the dispensed total field, for a selected time period, such as a shift, a day, a week, etc. If desired, the printout could further include information from each record in the recipe table, such as a string indicating the name of the recipe, accompanied by the contents of the count field.

In a further embodiment, the number of timeout period fields may be selected by a user, and the duration of each timeout period field may also be user-selected by modifying the 60 second counter register 592 to store, for example, a 30 second counter or any other desired counter.

In a further embodiment, referring back to FIGS. 2 and 7, the variance controller may be simultaneously connected to a plurality of beer metering systems and to a plurality of liquor dispensing systems. Optionally, the metering system processing circuit 62 may be equipped with a second communications transmit buffer 115 and a third I/O port 73 connected to additional dispensing systems 75, as shown in broken outline in FIG. 2. Referring to FIG. 7, when the metering system 60 receives at the second I/O port 72 a message with an identifier byte which does not correspond to the metering system, block 152, shown in broken outline, directs the processing circuit to copy the data packet to the second communications transmit buffer 115. Block 158 then directs the processing circuit to call a transmit routine 105, which is a conventional transmit routine for transmitting a four-byte data packet according to the protocol shown in FIG. 6 on the network 39. The transmit routine 105 directs the processing circuit to transmit the four-byte data packet in the downstream direction on the network 39, to the next of the additional dispensing systems 75. Thus, a plurality of beer metering systems and liquor control systems may be "daisy-chained" together in this manner, all linked to a single variance controller.

While specific embodiments of the invention have been described and illustrated, such embodiments should be considered illustrative of the invention only and not as limiting the invention as construed in accordance with the accompanying claims.

What is claimed is:

1. A computer implemented method comprising:
  a) receiving and storing request indications representing requests for corresponding requested amounts of an item;
  b) receiving and storing provided indications representing provided amounts of said item;
  c) when a representation of a new requested amount is received, cancelling a previous provided amount and reducing said new requested amount by the cancelled previous provided amount and adding any reduced new requested amount to a previous requested amount;
  d) when a representation of a new provided amount is received, cancelling a previous requested amount and reducing said new provided amount by the cancelled previous requested amount and adding and reduced new provided amount to a previous provided amount;

e) associating said previous requested amounts with respective time periods and associating said previous provided amounts with respective time periods; and f) signalling an operator by causing the computer to provide at least one of a visual signal and an audio signal to the operator when the reduced new requested amount or the reduced new provided amount is not equal to zero.

2. A method as claimed in claim 1 wherein cancelling the previous provided amount includes cancelling the previous provided amounts associated with successively later time periods while reducing said new requested amount by each cancelled previous provided amount and adding any non-cancelled new requested amount to said previous requested amount associated with a latest time period.

3. A method as claimed in claim 1 wherein cancelling the previous requested amount includes cancelling the previous requested amounts associated with successively later time periods while reducing said new provided amount by each cancelled previous requested amount and adding any non-cancelled new provided amount to said previous provided amount associated with a latest time period.

4. A method as claimed in claim 1 further including receiving said representation of said new requested amount from a point of sale system.

5. A method as claimed in claim 1 further including receiving said representation of said new provided amount from a fluid dispensing system.

6. A method as claimed in claim 1 further including receiving said representation of said new provided amount from a liquor dispensing system.

7. A method as claim 1 further including maintaining a provided total of each of said cancelled previous provided amounts and previous provided amounts which have not been cancelled within a predefined period of time.

8. A method as claimed in claim 7 further including maintaining a requested total of each of said cancelled previous requested amounts and previous requested amounts which have not been cancelled within said pre-defined period of time.

9. A method as claimed in claim 8 further including calculating a difference between said provided total and said requested total.

10. A method as claimed in claim 9 further including displaying said difference.

11. A method as claimed in claim 1 further including calculating a sum of non-cancelled previous requested amounts.

12. A method as claimed in claim 11 further including displaying said sum of said non-cancelled previous requested amounts.

13. A method as claimed in claim 1 further including calculating a sum of non-cancelled previous provided amounts.

14. A method as claimed in claim 13 further including displaying said sum of said non-cancelled previous provided amounts.

15. A computer implemented method comprising:
a) receiving information indicating at least one of:
   i) a new requested amount of at least one of a plurality of items; and
   ii) a new provided amount of at least one of said plurality of items;
b) when said information indicating said new requested amount is received, storing said new requested amount and determining which of said items said new requested amount relates to and for said item cancelling a previous provided amount and reducing said new requested amount by the cancelled provided amount and adding any non-cancelled new requested amount to a previous requested amount;

c) when said information indicating said new provided amount is received, storing said new provided amount and determining which of said items said new provided amount relates to and for said item cancelling the previous requested amount and reducing said new provided amount by the cancelled requested amount and adding any non-cancelled new provided amount to said previous provided amount;

d) associating said previous requested amounts with respective time periods and associating said previous provided amounts with respective time periods; and e) signalling an operator by causing the computer to provide at least one of a visual signal and an audio signal to the operator when said non-cancelled new requested amount or said non-cancelled new provided amount is not equal to zero.

16. A method as claimed in claim 15 wherein cancelling the previous provided amount includes cancelling the previous provided amounts associated with successively later time periods and reducing said new requested amount by each cancelled previous provided amount and adding any non-cancelled new requested amount to said previous requested amount associated with a latest time period.

17. A method as claimed in claim 15 wherein cancelling the previous requested amount includes cancelling the previous requested amounts associated with successively later time periods and reducing said new provided amount by each cancelled previous requested amount and adding any non-cancelled new provided amount to said previous provided amount associated with a latest time period.

18. A method as claimed in claim 15 wherein receiving said information indicating said new requested amount includes receiving said information indicating said new requested amount from a point of sale system.

19. A method as claimed in claim 15 wherein receiving said information indicating said new provided amount includes receiving said information indicating said new provided amount from a fluid dispensing system.

20. A method as claimed in claim 15 wherein receiving said information indicating said new provided amount includes receiving said information indicating said new provided amount from a liquor dispensing system.

21. A method as claimed in claim 15 further including, for each item of said plurality of items, maintaining a provided total of each of said cancelled previous provided amounts and previous provided amounts which have not been cancelled within a predefined period of time.

22. A method as claimed in claim 21 further including, for each item of said plurality of items, maintaining a requested total of each of said cancelled previous requested amounts and previous requested amounts which have not been cancelled within said pre-defined period of time.

23. A method as claimed in claim 22 further including, for each item of said plurality of items, calculating a difference between said provided total and said requested total.

24. A method as claimed in claim 23 further including displaying said difference, for at least one of said plurality of items.

25. A method as claimed in claim 15 further including, for each item of said plurality of items, calculating a sum of non-cancelled previous requested amounts.

26. A method as claimed in claim 25 further including displaying said sum of said non-cancelled previous requested amounts, for at least one of said plurality of items.

27. A method as claimed in claim 15 further including, for each item of said plurality of items, calculating a sum of non-cancelled previous provided amounts.

28. A method as claimed in claim 27 further including displaying said sum of said non-cancelled previous provided amounts, for at least one of said plurality of items.

29. An apparatus comprising:
   a) means for receiving and means for storing request indications representing requests for corresponding requested amounts of an item;
   b) means for receiving and means for storing provided indications representing providing amounts of said item;
   c) means for cancelling a previous provided amount and reducing a new requested amount by the cancelled previous provided amount and adding any new requested amount to a previous requested amount;
   d) means for cancelling a previous requested amount and reducing a new provided amount by the cancelled previous requested amount and adding any new provided amount to a previous provided amount;
   e) means for associating said previous requested amounts with respective time periods and means for associating said previous provided amounts with respective time periods, and
   f) means for signalling an operator by causing the computer to provide at least one of a visual signal and an audio signal to the operator when the reduced new requested amount or the reduced new provided amount is not equal to zero.

30. An apparatus as claimed in claim 29 wherein the means for cancelling the previous provided amount includes means for cancelling the previous provided amounts associated with successively later time periods and for reducing said new requested amount by each cancelled previous provided amount and for adding any noncancelled new requested amount to said previous requested amount associated with a latest time period.

31. An apparatus as claimed in claim 29 wherein the means for cancelling the previous requested amount includes means for cancelling the previous requested amounts associated with successively later time periods and for reducing said new provided amount by each cancelled previous requested amount and for adding any non-cancelled new provided amount to said previous provided amount associated with a latest time period.

32. An apparatus as claimed in claim 29 wherein said means for receiving said request indication includes means for receiving said representation of said new requested amount from a point of sale system.

33. An apparatus as claimed in claim 29 wherein said means for receiving said provided indication includes means for receiving said representation of said new provided amount from a fluid dispensing system.

34. An apparatus as claimed in claim 29 wherein said means for receiving said provided indication includes means for receiving said representation of said new provided amount from a liquor dispensing system.

35. An apparatus as claimed in claim 29 further including means for maintaining a provided total of each of said cancelled previous provided amounts and previous provided amounts which have not been cancelled within a pre-defined period of time.

36. An apparatus as claimed in claim 35 further including means for maintaining a requested total of each of said cancelled previous requested amounts and previous requested amounts which have not been cancelled within a pre-defined period of time.

37. An apparatus as claimed in claim 36 further including means for calculating a difference between said provided total and said requested total.

38. An apparatus as claimed in claim 37 further including means for displaying said difference.

39. An apparatus as claimed in claim 29 further including means for calculating a sum of non-cancelled previous requested amounts.

40. An apparatus as claimed in claim 39 further including means for displaying said sum of said non-cancelled previous requested amounts.

41. An apparatus as claimed in claim 29 further including means for calculating a sum of non-cancelled previous provided amounts.

42. An apparatus as claimed in claim 41 further including means for displaying said sum of said non-cancelled previous provided amounts.

43. An apparatus comprising:
   a) a request indication receiver for receiving request indications representing requests for corresponding requested amounts of an item;
   b) a provided indication receiver for receiving provided indications representing provided amounts of said item;
   c) a storage device for storing said request indications and said provided indications;
   d) a signal device operable to visually or audibly signal an operator; and
   e) a processor circuit in cooperation with said storage device to
      i) associate previous provided amounts with respective time periods and to associate previous requested amounts with respective time periods;
      ii) when a new request indication is received cancel a previous provided amount, reduce a new requested amount by the cancelled provided amount and add the reduced new requested amount to a previous requested amount;
      iii) when a new provided indication is received cancel said previous requested amount, and reduce a new provided amount by the cancelled requested amount and add the reduced new provided amount to a previous provided amount; and
      iv) actuate said signal device to signal the operator when the reduced new requested amount or the reduced new provided amount is not equal to zero.

44. An apparatus as claimed in claim 43 wherein said processor circuit cooperates with said storage device to store said indications in said storage device.

45. An apparatus as claimed in claim 43 wherein said processor circuit cooperates with said storage device to associate said indication with respective time periods.

46. An apparatus as claimed in claim 43 wherein said processor circuit cooperates with the storage device to canceled previous provided amounts associated with successively later time periods and to reduce said new requested amount by each cancelled previous provided amount and to add any remaining new requested amount to said previous requested amount associated with a latest time period.

47. An apparatus as claimed in claim 43 wherein said processor circuit cooperates with the storage device to cancel previous requested amounts associated with successively later time periods and to reduce said new provided amount by each cancelled previous requested amount and to add any remaining new provided amount to said previous provided amount associated with a latest time period.

48. An apparatus as claimed in claim 43 wherein said request indication receiver is operable to receive said representation of said new requested amount from a point of sale system.

49. An apparatus as claimed in claim 43 wherein said provided indication receiver is operable to receive said representation of said new provided amount from a fluid dispensing system.

50. An apparatus as claimed in claim 43 wherein said provided indication receiver is operable to receive said indication of said new provided amount from a liquor dispensing system.

51. An apparatus as claimed in claim 43 wherein said processor circuit cooperates with said storage device to maintain a provided total of each of said cancelled previous provided amounts and previous provided amounts which have not been cancelled within a predefined period of time.

52. An apparatus as claimed in claim 51 wherein said processor circuit cooperates with said storage device to maintain a request total of each of said cancelled previous requested amounts and previous requested amounts which have not been cancelled within a pre-defined period of time.

53. An apparatus as claimed in claim 52 wherein said processor circuit cooperates with said storage device to calculate a difference between said provided total and said request total.

54. An apparatus as claimed in claim 53 wherein said signal device includes a display in communication with said processing circuit for displaying said difference.

55. An apparatus as claimed in claim 53 wherein said signal device includes a printer in communication with said processor circuit such that said processing circuit directs said printer to print an indication of said difference.

56. An apparatus as claimed in claim 43 wherein said processor circuit cooperates with said storage device to calculate a sum of non-cancelled previous requested amounts.

57. An apparatus as claimed in claim 56 wherein said signal device includes a display in communication with said processing circuit for displaying said sum of said non-cancelled previous requested amounts.

58. An apparatus as claimed in claim 43 wherein said processor circuit cooperates with said storage device to calculate a sum of non-cancelled previous provided amounts.

59. An apparatus as claimed in claim 58 wherein said signal device includes a display in communication with said processor circuit for displaying said sum of said non-cancelled previous provided amounts.

60. A system including the apparatus as claimed in claim 43 and further comprising a point of sale terminal in communication with said request indication receiver for providing said representations of said new requested amounts of said item.

61. A system as claimed in claim 60 further including a fluid dispensing system in communication with said provided indication receiver for providing said indications of said new provided amounts of said item.

62. A system as claimed in claim 61 wherein said fluid dispensing system includes a liquor dispensing system.

63. A system as claimed in claim 61 wherein said fluid dispensing system includes a beer dispensing system.

64. A system as claimed in claim 60 further including a printer in communication with said apparatus for printing information stored in said storage device.

* * * * *